US012667225B2

(12) United States Patent
Gorlicka et al.

(10) Patent No.: US 12,667,225 B2
(45) Date of Patent: Jun. 30, 2026

(54) IGNITOR MOUNTING BRACKETS FOR PELLET GRILLS

(71) Applicant: Weber-Stephen Products LLC, Palatine, IL (US)

(72) Inventors: Natalia Gorlicka, Itasca, IL (US); Ethan Albrecht, Evanston, IL (US)

( * ) Notice: Subject to any disclaimer, the term of this patent is extended or adjusted under 35 U.S.C. 154(b) by 391 days.

(21) Appl. No.: 18/533,553

(22) Filed: Dec. 8, 2023

(65) Prior Publication Data

US 2025/0185850 A1     Jun. 12, 2025

(51) Int. Cl.
*A47J 37/07* (2006.01)

(52) U.S. Cl.
CPC ......... *A47J 37/079* (2013.01); *A47J 37/0704* (2013.01)

(58) Field of Classification Search
CPC .......................... A47J 37/0704; A47J 37/079
See application file for complete search history.

(56) References Cited

U.S. PATENT DOCUMENTS

| | | | |
|---|---|---|---|
| 5,137,010 A | 8/1992 | Whitfield et al. |
| 5,295,474 A | 3/1994 | Whitfield et al. |
| 5,383,446 A | 1/1995 | Whitfield |
| 5,488,943 A | 2/1996 | Whitfield et al. |
| 5,617,841 A | 4/1997 | Whitfield et al. |
| 7,900,553 B1 | 3/2011 | Maurin |
| 9,759,429 B2 | 9/2017 | Tucker |
| 9,814,354 B2 | 11/2017 | McAdams et al. |
| 10,105,007 B2 | 10/2018 | Colston et al. |

| | | | |
|---|---|---|---|
| 10,426,295 B2 | 10/2019 | McAdams et al. |
| 10,436,439 B1 | 10/2019 | Traeger |
| 10,670,276 B2 | 6/2020 | Traeger |
| 10,729,283 B2 | 8/2020 | McAdams et al. |
| 10,986,960 B2 | 4/2021 | Colston |
| 11,064,837 B2 | 7/2021 | Yang et al. |
| 11,085,631 B1 | 8/2021 | Traeger |
| 11,116,360 B2 | 9/2021 | Dahle et al. |
| 11,181,276 B2 | 11/2021 | Colston et al. |
| 11,248,799 B2 | 2/2022 | Donnelly et al. |
| 11,259,667 B2 | 3/2022 | Colston et al. |
| 11,317,761 B2 | 5/2022 | Traeger |
| 11,350,791 B2 | 6/2022 | Colston et al. |

(Continued)

FOREIGN PATENT DOCUMENTS

| | | |
|---|---|---|
| CN | 111084202 A | 5/2020 |

OTHER PUBLICATIONS

International Searching Authority, "International Search Report and Written Opinion," issued in connection with International Patent Application No. PCT/US2024/054582, mailed on Feb. 25, 2025, 9 pages.

*Primary Examiner* — Alfred Basichas
(74) *Attorney, Agent, or Firm* — Avantech Law, LLP

(57)     ABSTRACT

Ignitor mounting brackets for pellet grills are disclosed. An example mounting bracket includes a base and an ignitor tab. The base includes a first surface, a second surface, and a primary opening. The second surface is located opposite the first surface. The primary opening is formed in and extends through the base from the first surface to the second surface. The primary opening is configured to receive an auger tube of a pellet grill. The ignitor tab is coupled to the base. The ignitor tab includes an ignitor tab opening formed in and extending through the ignitor tab. The ignitor tab opening is configured to receive an ignitor of a pellet grill.

20 Claims, 23 Drawing Sheets

(56) References Cited

U.S. PATENT DOCUMENTS

| | | | |
|---|---|---|---|
| 11,678,767 | B2 | 6/2023 | Colston et al. |
| 2009/0293860 | A1 | 12/2009 | Carlson |
| 2010/0261128 | A1 | 10/2010 | Li |
| 2011/0048398 | A1 | 3/2011 | Christensen et al. |
| 2013/0298894 | A1 | 11/2013 | Kleinsasser |
| 2014/0326233 | A1 | 11/2014 | Traeger |
| 2016/0327263 | A1 | 11/2016 | Traeger |
| 2017/0164783 | A1 | 6/2017 | Sauerwein et al. |
| 2017/0176018 | A1 | 6/2017 | Traeger |
| 2018/0146824 | A1 | 5/2018 | Kim et al. |
| 2018/0296031 | A1 | 10/2018 | Terrell, Jr. et al. |
| 2018/0368617 | A1 | 12/2018 | Allmendinger |
| 2019/0274479 | A1 | 9/2019 | Chung |
| 2020/0240643 | A1* | 7/2020 | Donnelly ............ A47J 37/0704 |
| 2020/0333011 | A1 | 10/2020 | Ahmed et al. |
| 2021/0037840 | A1 | 2/2021 | Garces et al. |
| 2021/0196078 | A1 | 7/2021 | Colston et al. |
| 2021/0293413 | A1* | 9/2021 | Donnelly ................ F23N 5/203 |
| 2021/0352923 | A1 | 11/2021 | Li et al. |
| 2022/0039596 | A1 | 2/2022 | Dahle et al. |

* cited by examiner

SECTION A-A

SECTION B-B

SECTION C-C

IGNITOR MOUNTING BRACKETS FOR PELLET GRILLS

FIELD OF THE DISCLOSURE

This disclosure relates generally to ignitor mounting brackets and, more specifically, to ignitor mounting brackets for pellet grills.

BACKGROUND

Pellet grills are electronically-controlled cooking devices that are configured to cook (e.g., smoke, grill, bake, roast, broil, sear, and/or otherwise heat) food items located within (e.g., placed on one or more cooking grate(s) positioned within) a cooking chamber of the pellet grill. The controllable electronic components of the pellet grill can be powered via AC power (e.g., supplied to the pellet grill via household electricity or wall power) or DC power (e.g., supplied via an on-board or connected battery and/or DC power supply).

Conventional pellet grills store a volume of combustible pellet fuel (e.g., wood-based pellets) in a hopper that is mounted and/or coupled to the pellet grill. A motor-driven auger in communication with an exit opening of the hopper feeds and/or supplies the pellet fuel from the hopper into a burn pot of the pellet grill in a controlled and/or automated manner. The speed, rate, and/or duty cycle of the auger is typically based on a user-selected temperature (e.g., a temperature setpoint) that is established and/or desired for the cooking chamber of the pellet grill. Pellet fuel that is deposited in the burn pot can initially be ignited via an ignitor (e.g., a DC-powered glow plug) of the pellet grill.

Combustion and/or burning of the pellet fuel within the burn pot produces, generates, and/or outputs heat which is subsequently distributed throughout the cooking chamber in a manner that causes the food items located within the cooking chamber to gradually become cooked. A motor-driven fan is typically implemented to assist with combusting the pellet fuel, and/or to assist with distributing and/or circulating heat (e.g., as may be produced by the combusted pellet fuel) throughout the cooking chamber.

Figure 2:
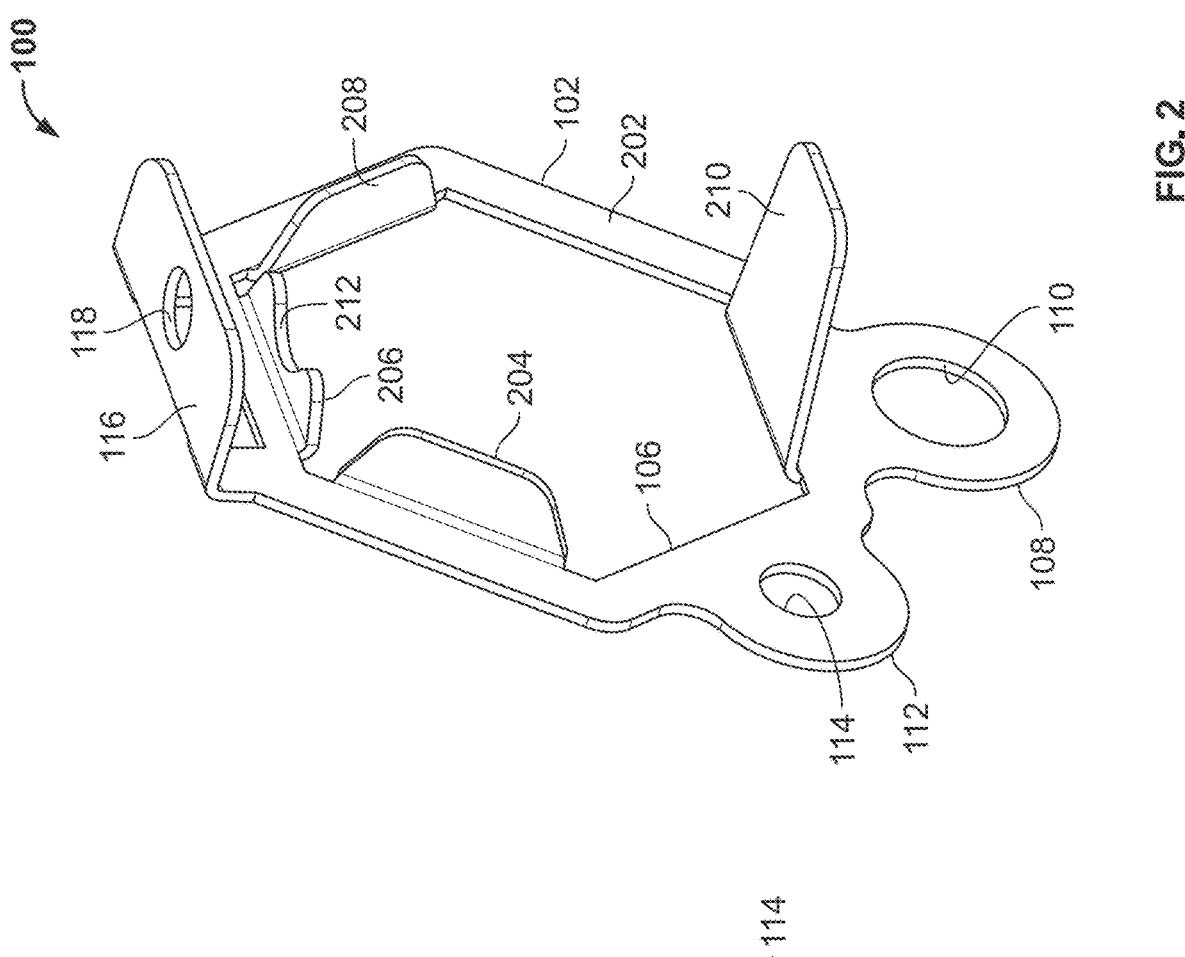
FIG. 2 is a second perspective view of the mounting bracket of FIG. 1.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

As discussed above, pellet grills are typically equipped with an ignitor (e.g., a DC-powered glow plug) configured to ignite pellet fuel (e.g., combustible wood pellets) located in a burn pot of the pellet grill. Replacement of the ignitor of the pellet grill is required from time to time, whether from normal use and/or wear of the ignitor, or from an unexpected malfunction of the ignitor. In some known pellet grills, the ignitor is coupled either directly to the burn pot, or directly to an ignitor carrier that must be accurately positioned relative to the burn pot. When the need to replace the ignitor of such pellet grills arises, the replacement process can present difficulties regarding the ease by which a user can consistently align the ignitor with the burn pot, and/or the ease by which a user can consistently space the ignitor relative to a sidewall and/or a floor of the burn pot. Inconsistent alignment and/or spacing of the replacement ignitor relative to the burn pot can adversely give rise to various inconsistencies regarding cooking operations to be performed on the pellet grill.

Unlike the known pellet grills described above, example pellet grills disclosed herein include a mounting bracket configured to removably mount an ignitor of the pellet grill to an auger tube of the pellet grill. Mounting the ignitor of the pellet grill to the auger tube of a pellet grill via one of the example mounting brackets disclosed herein advantageously increases the consistency of aligning the ignitor with a burn pot of the pellet grill, as well as the consistency of spacing the ignitor relative to a sidewall and/or a floor of the burn pot. Such improvements regarding the ability to consistently align and/or space the ignitor relative to the burn pot advantageously increase the consistency by which the ignitor successfully ignites pellet fuel located in the burn pot, as well as the consistency of various cooking operations to be performed on the pellet grill.

In some disclosed examples, a mounting bracket includes a base having a first surface, a second surface, and a primary opening. The second surface is located opposite the first surface. The primary opening is formed in and extends through the base from the first surface to the second surface. The primary opening is configured to receive an auger tube of a pellet grill, such that the base circumscribes the auger tube when the auger tube is received in the primary opening. In some disclosed examples, the base is planar. In some disclosed examples, the base has a hexagonal shape. In some disclosed examples, the primary opening has a hexagonal shape.

In some disclosed examples, the mounting bracket further includes an ignitor tab coupled to the base. The ignitor tab includes an ignitor tab opening formed in and extending through the ignitor tab. The ignitor tab opening is configured to receive an ignitor of a pellet grill. In some disclosed examples, the ignitor tab extends from the base in a radially outward direction. In some disclosed examples, the base and the ignitor tab are collectively planar.

In some disclosed examples, the mounting bracket further includes a grounding tab coupled to the base. The grounding tab includes a grounding tab opening formed in and extending through the grounding tab. The grounding tab opening is configured to receive a grounding fastener of a pellet grill. In some disclosed examples, the grounding tab extends from the base in a radially outward direction. In some disclosed examples, the base, the ignitor tab, and the grounding tab are collectively planar.

In some disclosed examples, the mounting bracket further includes a mounting tab coupled to the base. The mounting tab includes a mounting tab opening formed in and extending through the mounting tab. The mounting tab opening is configured to receive a mounting fastener. In some disclosed examples, the mounting tab is oriented perpendicularly relative to the base.

In some disclosed examples, the mounting bracket further includes a plurality of support tabs coupled to the base adjacent to the primary opening. In some disclosed examples, respective ones of the plurality of support tabs are oriented perpendicularly relative to the base.

In some disclosed examples, a pellet grill includes a hopper, a burn pot, an auger assembly, and a mounting bracket assembly. The auger assembly extends between the hopper and the burn pot. The auger assembly includes an auger and an auger tube. The auger tube circumscribes the auger. The auger is configured to transport pellet fuel received from the hopper through the auger tube and into the burn pot. The mounting bracket assembly includes a mounting bracket and an ignitor removably coupled to the mounting bracket. The mounting bracket includes a base and an ignitor tab.

In some disclosed examples, the base of the mounting bracket of the pellet grill includes a first surface, a second surface located opposite the first surface, and a primary opening formed in and extending through the base from the first surface to the second surface. The primary opening receives the auger tube such that the base circumscribes the auger tube. In some disclosed examples, the base is planar. In some disclosed examples, the base has a hexagonal shape. In some disclosed examples, the primary opening has a hexagonal shape.

In some disclosed examples, the ignitor tab of the mounting bracket of the pellet grill is coupled to the base. The ignitor tab includes an ignitor tab opening formed in and extending through the ignitor tab. The ignitor tab opening receives the ignitor. In some disclosed examples, the ignitor tab extends from the base in a radially outward direction. In some disclosed examples, the base and the ignitor tab are collectively planar.

In some disclosed examples, the mounting bracket of the pellet grill further includes a grounding tab coupled to the base. The grounding tab includes a grounding tab opening formed in and extending through the grounding tab. The grounding tab opening receives a grounding fastener. In some disclosed examples, the grounding tab extends from the base in a radially outward direction. In some disclosed examples, the base, the ignitor tab, and the grounding tab are collectively planar.

In some disclosed examples, the mounting bracket of the pellet grill further includes a mounting tab coupled to the base. The mounting tab includes a mounting tab opening formed in and extending through the mounting tab. The mounting tab opening receives a mounting fastener. In some disclosed examples, the mounting tab is oriented perpendicularly relative to the base.

In some disclosed examples, the mounting bracket of the pellet grill further includes a plurality of support tabs coupled to the base adjacent to the primary opening. In some disclosed examples, respective ones of the plurality of support tabs are oriented perpendicularly relative to the base, with the support tabs being configured to support and/or to locate the mounting bracket relative to the auger tube.

In some disclosed examples, the pellet grill further includes a housing configured to contain at least a portion of the burn pot, at least a portion of the auger assembly, and at least a portion of the mounting bracket assembly. The mounting tab of the mounting bracket is removably coupled to the housing via the mounting fastener.

The above-identified features as well as other advantageous features of example ignitor mounting brackets disclosed herein are further described below in connection with the figures of the application.

As used herein, the term "configured" means sized, shaped, arranged, structured, oriented, positioned, and/or located. For example, in the context of a first part configured to fit within a second part, the first part is sized, shaped, arranged, structured, oriented, positioned, and/or located to fit within the second part.

As used herein, in the context of a first object circumscribing a second object, the term "circumscribe" means that the first object is constructed around and/or defines an area around the second object. In interpreting the term "circumscribe" as used herein, it is to be understood that the first object circumscribing the second object can include gaps and/or can consist of multiple spaced-apart objects, such that a boundary formed by the first object around the second object is not necessarily a continuous boundary.

As used herein, unless otherwise stated, the terms "above" and "below" describe the relationship of two parts relative to Earth. For example, as used herein, a first part is "above" a second part if the second part is closer to Earth than the first part is. As another example, as used herein, a first part is "below" a second part if the first part is closer to Earth than the second part is. It is to be understood that a first part can be above or below a second part with one or more of: another part or parts therebetween; without another part therebetween; with the first and second parts contacting one another; or without the first and second parts contacting one another.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

As used herein, the terms "substantially" and/or "approximately" modify their subjects and/or values to recognize the potential presence of variations that occur in real world applications. For example, "substantially" and/or "approximately" may modify dimensions that may not be exact due to manufacturing tolerances and/or other real-world imperfections as will be understood by persons of ordinary skill in the art. For example, "substantially" and/or "approximately" may indicate such dimensions may be within a tolerance range of +/−10% unless otherwise specified in the description provided herein.

As used herein, the terms "including" and "comprising" (and all forms and tenses thereof) are open-ended terms.

Thus, whenever the written description or a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or method actions may be implemented by, for example, the same entity or object. Additionally, although individual features may be included in different examples or claims, these may possibly be combined, and the inclusion in different examples or claims does not imply that a combination of features is not feasible and/or advantageous.

The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C.

As used herein, when the phrase "at least" is used as the transition term in, for example, a preamble of a claim, it is open-ended in the same manner as the term "comprising" and "including" are open-ended. As used herein in the context of describing structures, components, items, objects, and/or things, the phrase "at least one of A and B" is intended to refer to implementations including any of (1) at least one A, (2) at least one B, or (3) at least one A and at least one B. Similarly, as used herein in the context of describing structures, components, items, objects, and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, or (3) at least one A and at least one B.

Figure 1:
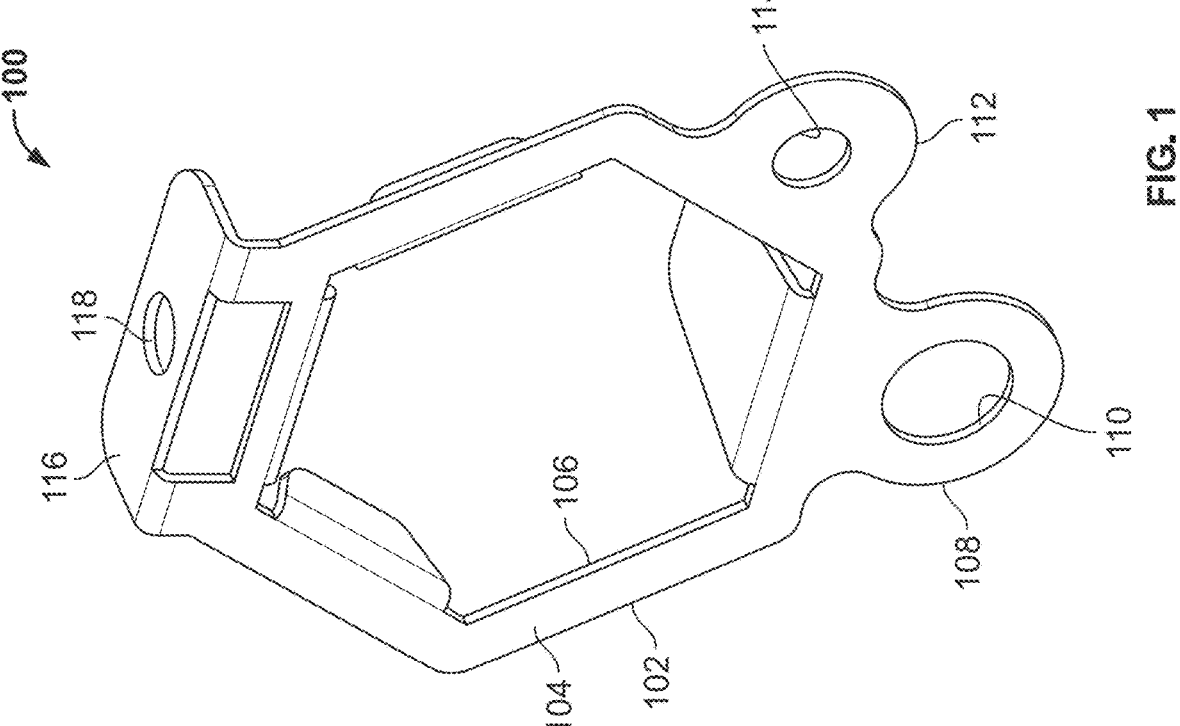
FIG. 1 is a first perspective view of an example mounting bracket constructed in accordance with the teachings of this disclosure.
Figure 4:
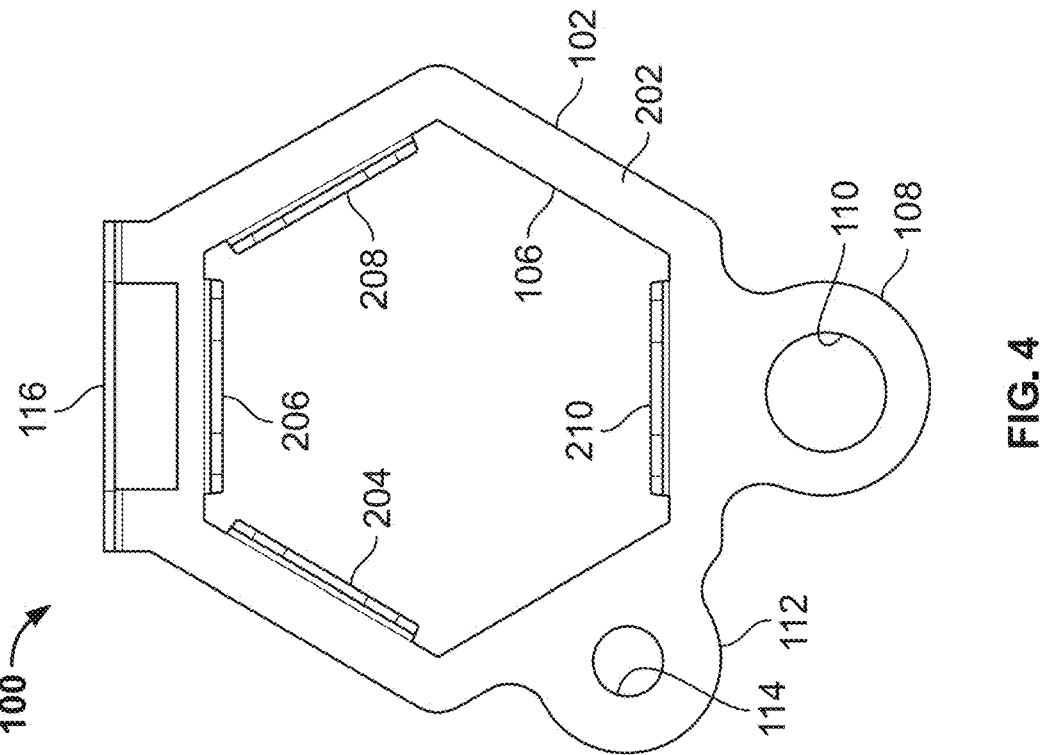
FIG. 4 is a rear view of the mounting bracket of FIGS. 1-3.
Figure 3:
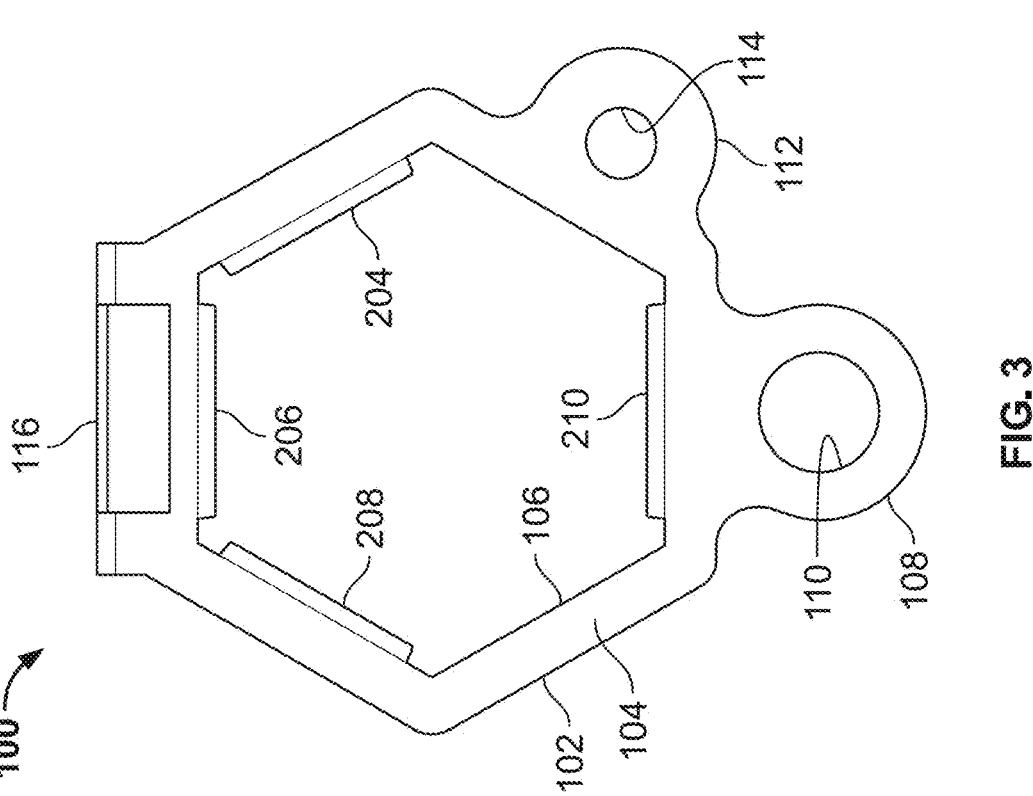
FIG. 3 is a front view of the mounting bracket of FIGS. 1 and 2.
Figure 6:
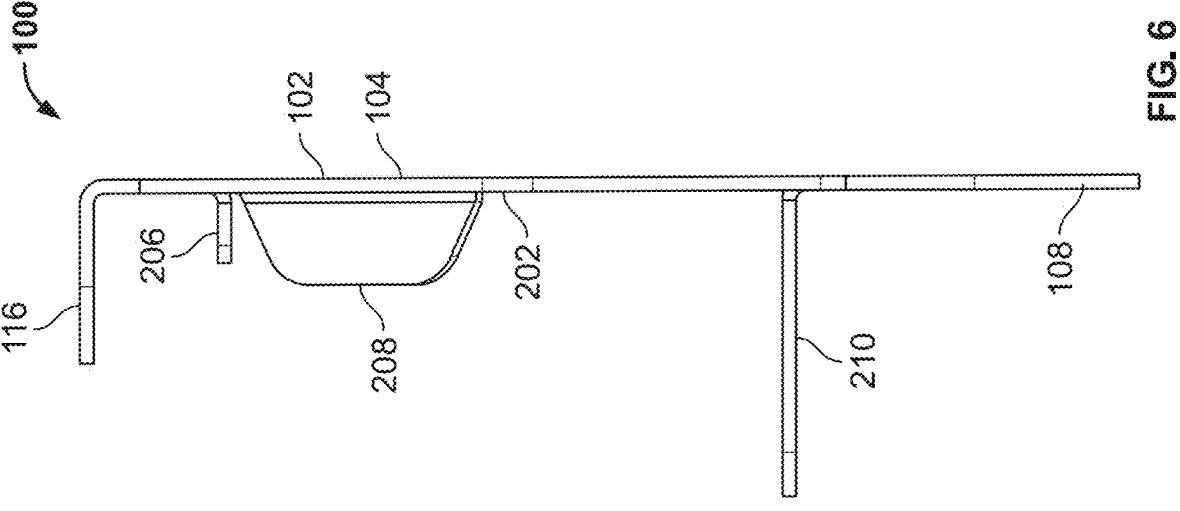
FIG. 6 is a left side view of the mounting bracket of FIGS. 1-5.
Figure 5:
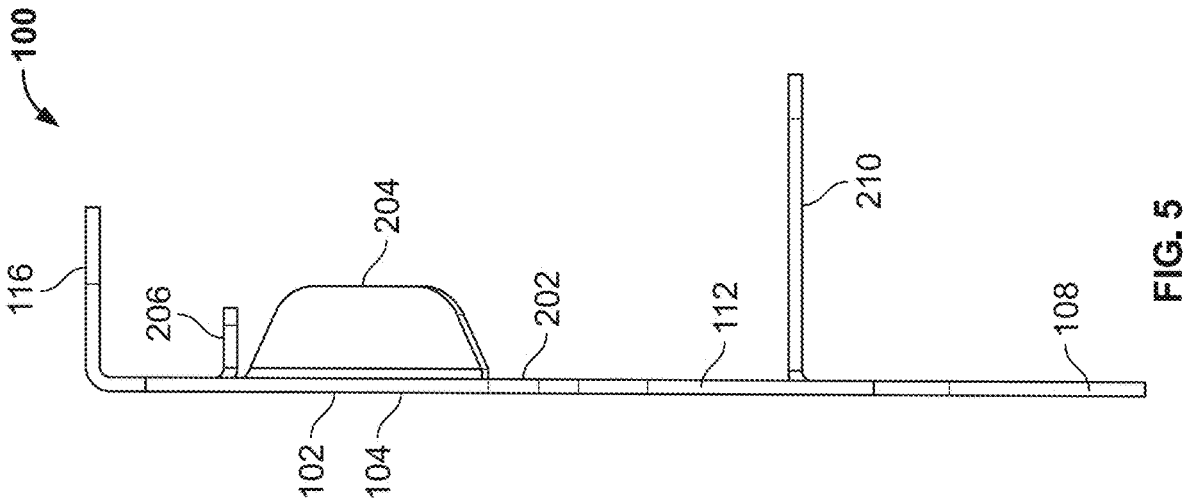
FIG. 5 is a right side view of the mounting bracket of FIGS. 1-4.
Figure 7:
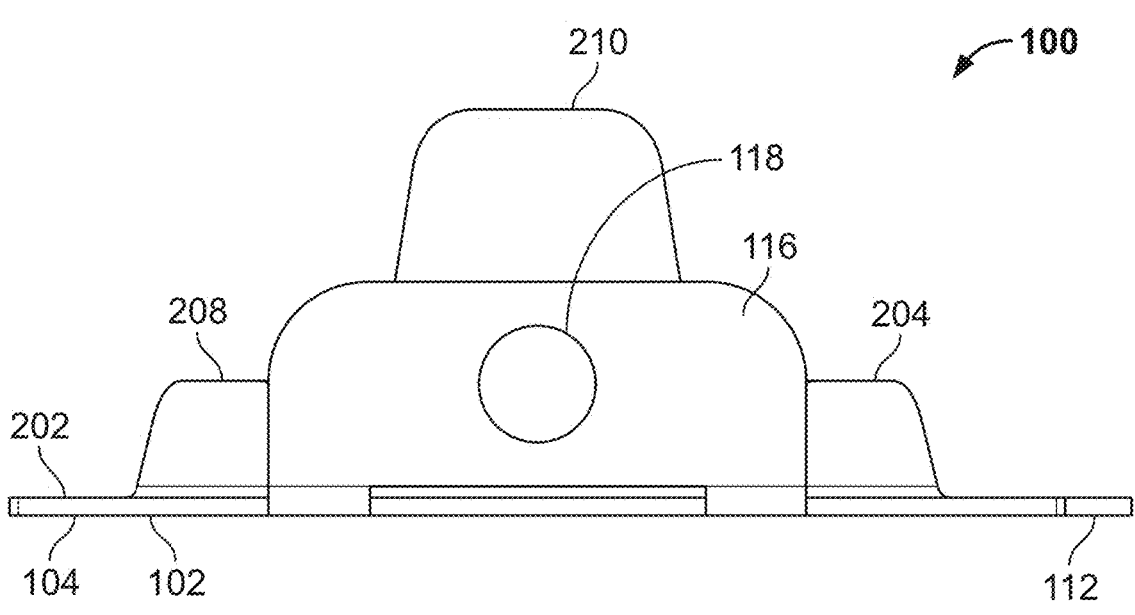
FIG. 7 is a top view of the mounting bracket of FIGS. 1-6.
Figure 8:
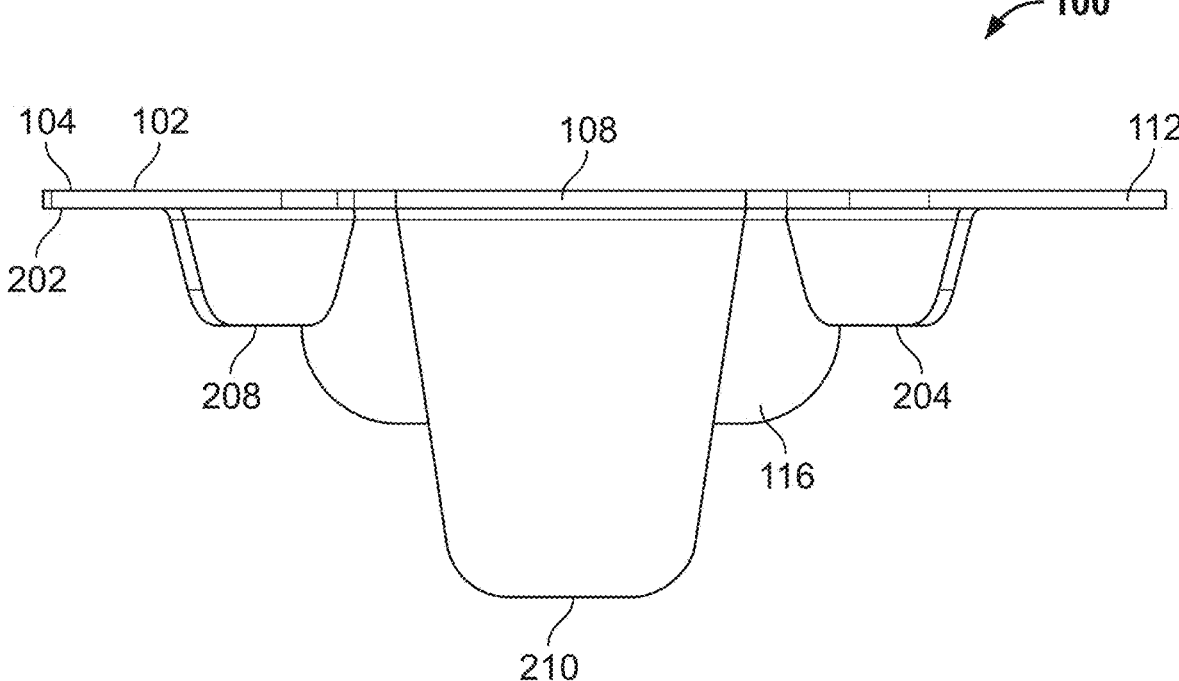
FIG. 8 is a bottom view of the mounting bracket of FIGS. 1-7.

FIG. 1 is a first perspective view of an example mounting bracket 100 constructed in accordance with the teachings of this disclosure. FIG. 2 is a second perspective view of the mounting bracket 100 of FIG. 1. FIG. 3 is a front view of the mounting bracket 100 of FIGS. 1 and 2. FIG. 4 is a rear view of the mounting bracket 100 of FIGS. 1-3. FIG. 5 is a right side view of the mounting bracket 100 of FIGS. 1-4. FIG. 6 is a left side view of the mounting bracket 100 of FIGS. 1-5. FIG. 7 is a top view of the mounting bracket 100 of FIGS. 1-6. FIG. 8 is a bottom view of the mounting bracket 100 of FIGS. 1-7.

The mounting bracket 100 of FIGS. 1-8 includes an example base 102 having an example first surface 104 and an example second surface 202. The second surface 202 of the base 102 is located opposite the first surface 104 of the base 102. In the illustrated example of FIGS. 1-8, the first surface 104 and the second surface 202 of the base 102 are planar and oriented parallel to one another. The base 102, therefore, is planar and/or flat. In other examples, the first surface 104 and/or the second surface 202 of the base 102 can be non-planar (e.g., not flat). In other examples, the second surface 202 of the base 102 can be angled relative to the first surface 104 of the base 102 such that the first surface 104 and the second surface 202 of the base 102 are not parallel to one another. In such other examples, the base 102 is not planar and/or not flat. In the illustrated example of FIGS. 1-8, the base 102 of the mounting bracket 100 has a hexagonal shape. In other examples, the base 102 of the mounting bracket 100 can instead have a different shape (e.g., a circular shape, a triangular shape, a rectangular shape, a pentagonal shape, etc.).

The base 102 of the mounting bracket 100 of FIGS. 1-8 further includes an example primary opening 106. The primary opening 106 is formed in and extends through the base 102 of the mounting bracket 100 from the first surface 104 to the second surface 202 of the base 102. The primary opening 106 is configured to receive an auger tube of a pellet grill, as further described below. In the illustrated example of FIGS. 1-8, the primary opening 106 of the mounting bracket 100 has a hexagonal shape. In other examples, the primary opening 106 of the mounting bracket 100 can instead have a different shape (e.g., a circular shape, a triangular shape, a rectangular shape, a pentagonal shape, etc.). In the illustrated example of FIGS. 1-8, the base 102 and the primary opening 106 of the mounting bracket 100 are collectively configured to form a continuous ring, with the continuous ring being configured to circumscribe an auger tube of a pellet grill when the auger tube is received in and/or extends through the primary opening 106 of the base 102. In other examples, the base 102 and/or the primary opening 106 of the mounting bracket 100 can instead be configured to form a partial ring (e.g., a non-continuous ring having two ends separated from one another by a gap), with the partial ring being configured to partially circumscribe an auger tube of a pellet grill.

The mounting bracket 100 of FIGS. 1-8 further includes an example ignitor tab 108. The ignitor tab 108 is coupled to (e.g., integrally formed with) the base 102 of the mounting bracket 100. In the illustrated example of FIGS. 1-8, the ignitor tab 108 extends from the from the base 102 in a radially outward direction relative to the primary opening 106, with the ignitor tab 108 being oriented parallel to the base 102. In other examples, the ignitor tab 108 can instead extend from the base 102 in a radially inward direction relative to the primary opening 106, with the ignitor tab 108 being oriented parallel to the base 102. In other examples, the ignitor tab 108 can instead extend from the base 102 in an axial direction relative to the primary opening 106 such that the ignitor tab 108 is oriented at an angle relative to the base 102 (e.g., such that the ignitor tab 108 is not oriented parallel to the base 102). In the illustrated example of FIGS. 1-8, the base 102 and the ignitor tab 108 of the mounting bracket 100 are individually and collectively planar and/or flat. In other examples, the base 102, the ignitor tab 108, and/or the combination of the base 102 and the ignitor tab 108 can instead be non-planar (e.g., not flat).

The ignitor tab 108 of FIGS. 1-8 includes an example ignitor tab opening 110. The ignitor tab opening 110 is formed in and extends through the ignitor tab 108. The ignitor tab opening 110 is configured to receive an ignitor of a pellet grill, as further described below. In the illustrated example of FIGS. 1-8, the ignitor tab opening 110 of the ignitor tab 108 has a circular shape. In other examples, the ignitor tab opening 110 of the ignitor tab 108 can instead have a different shape (e.g., a triangular shape, a rectangular shape, a hexagonal shape, etc.). In the illustrated example of FIGS. 1-8, the ignitor tab 108 and the ignitor tab opening 110 of the mounting bracket 100 are collectively configured to form a continuous ring, with the continuous ring being configured to circumscribe an ignitor of a pellet grill when the ignitor is received in and/or extends through the ignitor tab opening 110 of the ignitor tab 108. In other examples, the ignitor tab 108 and/or the ignitor tab opening 110 of the mounting bracket 100 can instead be configured to form a partial ring (e.g., a non-continuous ring having two ends separated from one another by a gap), with the partial ring being configured to partially circumscribe an ignitor of a pellet grill.

The mounting bracket 100 of FIGS. 1-8 further includes an example grounding tab 112. The grounding tab 112 is coupled to (e.g., integrally formed with) the base 102 of the mounting bracket 100. In the illustrated example of FIGS. 1-8, the grounding tab 112 extends from the from the base 102 in a radially outward direction relative to the primary opening 106, with the grounding tab 112 being oriented parallel to the base 102. In other examples, the grounding tab 112 can instead extend from the base 102 in a radially inward direction relative to the primary opening 106, with the grounding tab 112 being oriented parallel to the base 102. In other examples, the grounding tab 112 can instead extend from the base 102 in an axial direction relative to the primary opening 106 such that the grounding tab 112 is oriented at an angle relative to the base 102 (e.g., such that the grounding tab 112 is not oriented parallel to the base 102). In the illustrated example of FIGS. 1-8, the base 102, the ignitor tab 108, and the grounding tab 112 of the mounting bracket 100 are individually and collectively planar and/or flat. In other examples, the base 102, the ignitor tab 108, the grounding tab 112, and/or the combination of the base 102, the ignitor tab 108, and the grounding tab 112 can instead be non-planar (e.g., not flat). In the illustrated example of FIGS. 1-8, the grounding tab 112 of the mounting bracket 100 is separated from and/or not directly coupled to the ignitor tab 108 of the mounting bracket 100. In other examples, the grounding tab 112 of the mounting bracket 100 can instead contact and/or be directly coupled to the ignitor tab 108 of the mounting bracket 100.

The grounding tab 112 of FIGS. 1-8 includes an example grounding tab opening 114. The grounding tab opening 114 is formed in and extends through the grounding tab 112. The grounding tab opening 114 is configured to receive a grounding fastener of a pellet grill, as further described below. In the illustrated example of FIGS. 1-8, the grounding tab opening 114 of the grounding tab 112 has a circular shape. In other examples, the grounding tab opening 114 of the grounding tab 112 can instead have a different shape (e.g., a triangular shape, a rectangular shape, a hexagonal shape, etc.). In the illustrated example of FIGS. 1-8, the grounding tab 112 and the grounding tab opening 114 of the mounting bracket 100 are collectively configured to form a continuous ring, with the continuous ring being configured to circumscribe a grounding fastener of a pellet grill when the grounding fastener is received in and/or extends through the grounding tab opening 114 of the grounding tab 112. In other examples, the grounding tab 112 and/or the grounding tab opening 114 of the mounting bracket 100 can instead be configured to form a partial ring (e.g., a non-continuous ring having two ends separated from one another by a gap), with the partial ring being configured to partially circumscribe a grounding fastener of a pellet grill.

The mounting bracket 100 of FIGS. 1-8 further includes one or more support tab(s), with each one of the support tab(s) being coupled to (e.g., integrally formed with) the base 102 of the mounting bracket 100 and located adjacent to the primary opening 106 of the base 102. The support tab(s) is/are individually and/or collectively configured to support an auger tube of a pellet grill and/or to support the mounting bracket 100 relative to the auger tube of the pellet grill when the auger tube is received in and/or extends through the primary opening 106 of the base 102 of the mounting bracket 100. In the illustrated example of FIGS. 1-8, the mounting bracket 100 includes an example first support tab 204, an example second support tab 206, an example third support tab 208, and an example fourth support tab 210 that are respectively spaced apart from one another about the primary opening 106 of the base 102. In other examples, the mounting bracket 100 can instead include a different number (e.g., one, two, three, five, six, etc.) of support tabs. In the illustrated example of FIGS. 1-8, the second support tab 206 includes an example recess 212 configured to receive a mounting nut of a pellet grill, as further described below.

In the illustrated example of FIGS. 1-8, the first support tab 204, the second support tab 206, the third support tab 208, and the fourth support tab 210 respectively extend from the base 102 in an axial direction relative to the primary opening 106 of the base 102. In other examples, the first support tab 204, the second support tab 206, the third support tab 208, and/or the fourth support tab 210 can instead extend from the base 102 in a radially inward direction relative to the primary opening 106 of the base 102. In the illustrated example of FIGS. 1-8, the first support tab 204, the second support tab 206, the third support tab 208, and the fourth support tab 210 are parallel relative to one another and respectively oriented perpendicularly relative to the base 102. In other examples, the first support tab 204, the second support tab 206, the third support tab 208, and/or the fourth support tab 210 can instead be arranged such that the first support tab 204, the second support tab 206, the third support tab 208, and/or the fourth support tab 210 are not parallel to one another, and/or such that the first support tab 204, the second support tab 206, the third support tab 208, and/or the fourth support tab 210 is/are not oriented perpendicularly relative to the base 102.

In the illustrated example of FIGS. 1-8, the first support tab 204, the second support tab 206, the third support tab 208, and the fourth support tab 210 respectively extend from and/or are located on a common side of the base 102. For example, as shown in FIGS. 1-8, each one of the first support tab 204, the second support tab 206, the third support tab 208, and the fourth support tab 210 extends from and/or is located along the side of the base 102 defined by the second surface 202 of the base 102. In other examples, one or more of the first support tab 204, the second support tab 206, the third support tab 208, and the fourth support tab 210 can instead extend from and/or be located on a different side of the base 102 relative to the side of the base 102 from which other ones of the first support tab 204, the second support tab 206, the third support tab 208, and the fourth support tab 210 extend and/or are located on.

In the illustrated example of FIGS. 1-8, the first support tab 204, the second support tab 206, the third support tab 208, and the fourth support tab 210 of the mounting bracket 100 are respectively separated from and/or not directly coupled to the ignitor tab 108 and the grounding tab 112 of the mounting bracket 100. In other examples, the first support tab 204, the second support tab 206, the third support tab 208, and/or the fourth support tab 210 of the mounting bracket 100 can instead contact and/or be directly coupled to the ignitor tab 108 and the grounding tab 112 of the mounting bracket 100.

The first support tab 204, the second support tab 206, the third support tab 208, and the fourth support tab 210 of FIGS. 1-8 are respectively configured such that the first support tab 204 has a first length, the second support tab 206 has a second length that is slightly less than the first length, the third support tab 208 has a third length that is substantially equal to the first length, and the fourth support tab 210 has a fourth length that is substantially greater (e.g., approximately three times greater) than the first length, wherein each referenced length is a measured as the distance by which the corresponding support tab extends from the base 102. In other examples, the first support tab 204, the second support tab 206, the third support tab 208, and the fourth support tab 210 of the mounting bracket 100 can instead be configured to all have the same length. In still other examples, any of the first support tab 204, the second support tab 206, the third support tab 208, and the fourth support tab 210 of the mounting bracket 100 can be configured to be of a length that is substantially less than, substantially equal to, or substantially greater than any other one(s) of the first support tab 204, the second support tab 206, the third support tab 208, and the fourth support tab 210 of the mounting bracket 100.

The mounting bracket 100 of FIGS. 1-8 further includes an example mounting tab 116. The mounting tab 116 is coupled to (e.g., integrally formed with) the base 102 of the mounting bracket 100. In the illustrated example of FIGS. 1-8, the mounting tab 116 extends from the from the base 102 in an axial direction relative to the primary opening 106 such that the mounting tab 116 is oriented at an angle relative to the base 102 (e.g., such that the mounting tab 116 is not oriented parallel to the base 102). For example, as shown in FIGS. 1-8, the mounting tab 116 is oriented perpendicularly relative to the base 102. In other examples, the mounting tab 116 can instead extend from the base 102 in a radially outward direction relative to the primary opening 106, with the mounting tab 116 being oriented parallel to the base 102.

In the illustrated example of FIGS. 1-8, the mounting tab 116 extends from and/or is located on the same side of the base 102 from which the above-described support tabs extend and/or are located on. For example, as shown in FIGS. 1-8, the mounting tab 116 and each one of the first support tab 204, the second support tab 206, the third support tab 208, and the fourth support tab 210 extends from and/or is located along the side of the base 102 defined by the second surface 202 of the base 102. In other examples, the mounting tab 116 can instead extend from and/or be located on a different side of the base 102 relative to the side of the base 102 from which the first support tab 204, the second support tab 206, the third support tab 208, and/or the fourth support tab 210 extend and/or are located on.

In the illustrated example of FIGS. 1-8, the mounting tab 116 of the mounting bracket 100 is separated from and/or not directly coupled to the ignitor tab 108, the grounding tab 112, the first support tab 204, the second support tab 206, the third support tab 208, and the fourth support tab 210 of the mounting bracket 100. In other examples, the mounting tab 116 of the mounting bracket 100 can instead contact and/or be directly coupled the ignitor tab 108, the grounding tab 112, the first support tab 204, the second support tab 206, the third support tab 208, and the fourth support tab 210 of the mounting bracket 100.

The mounting tab 116 of FIGS. 1-8 includes an example mounting tab opening 118. The mounting tab opening 118 is formed in and extends through the mounting tab 116. The mounting tab opening 118 is configured to receive a mounting fastener of a pellet grill, as further described below. In the illustrated example of FIGS. 1-8, the mounting tab opening 118 of the mounting tab 116 has a circular shape. In other examples, the mounting tab opening 118 of the mounting tab 116 can instead have a different shape (e.g., a triangular shape, a rectangular shape, a hexagonal shape, etc.). In the illustrated example of FIGS. 1-8, the mounting tab 116 and the mounting tab opening 118 of the mounting bracket 100 are collectively configured to form a continuous ring, with the continuous ring being configured to circumscribe a mounting fastener of a pellet grill when the mounting fastener is received in and/or extends through the mounting tab opening 118 of the mounting tab 116. In other examples, the mounting tab 116 and/or the mounting tab opening 118 of the mounting bracket 100 can instead be configured to form a partial ring (e.g., a non-continuous ring having two ends separated from one another by a gap), with the partial ring being configured to partially circumscribe a mounting fastener of a pellet grill.

Figures 9, 10:
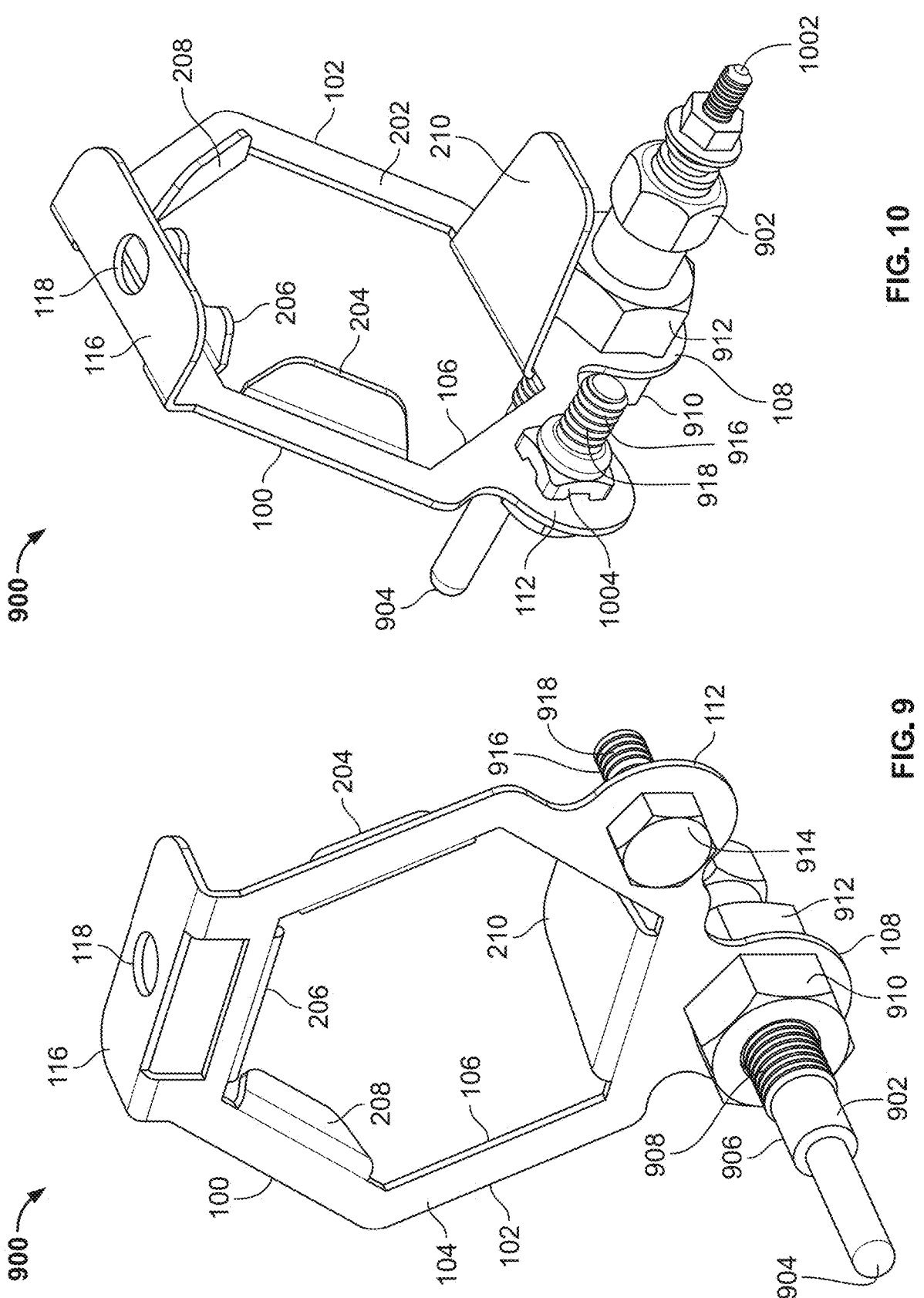
FIG. 9 is a first perspective view of an example mounting bracket assembly including the mounting bracket of FIGS. 1-8 and an example ignitor.
FIG. 10 is a second perspective view of the mounting bracket assembly of FIG. 9.
Figures 11, 12:
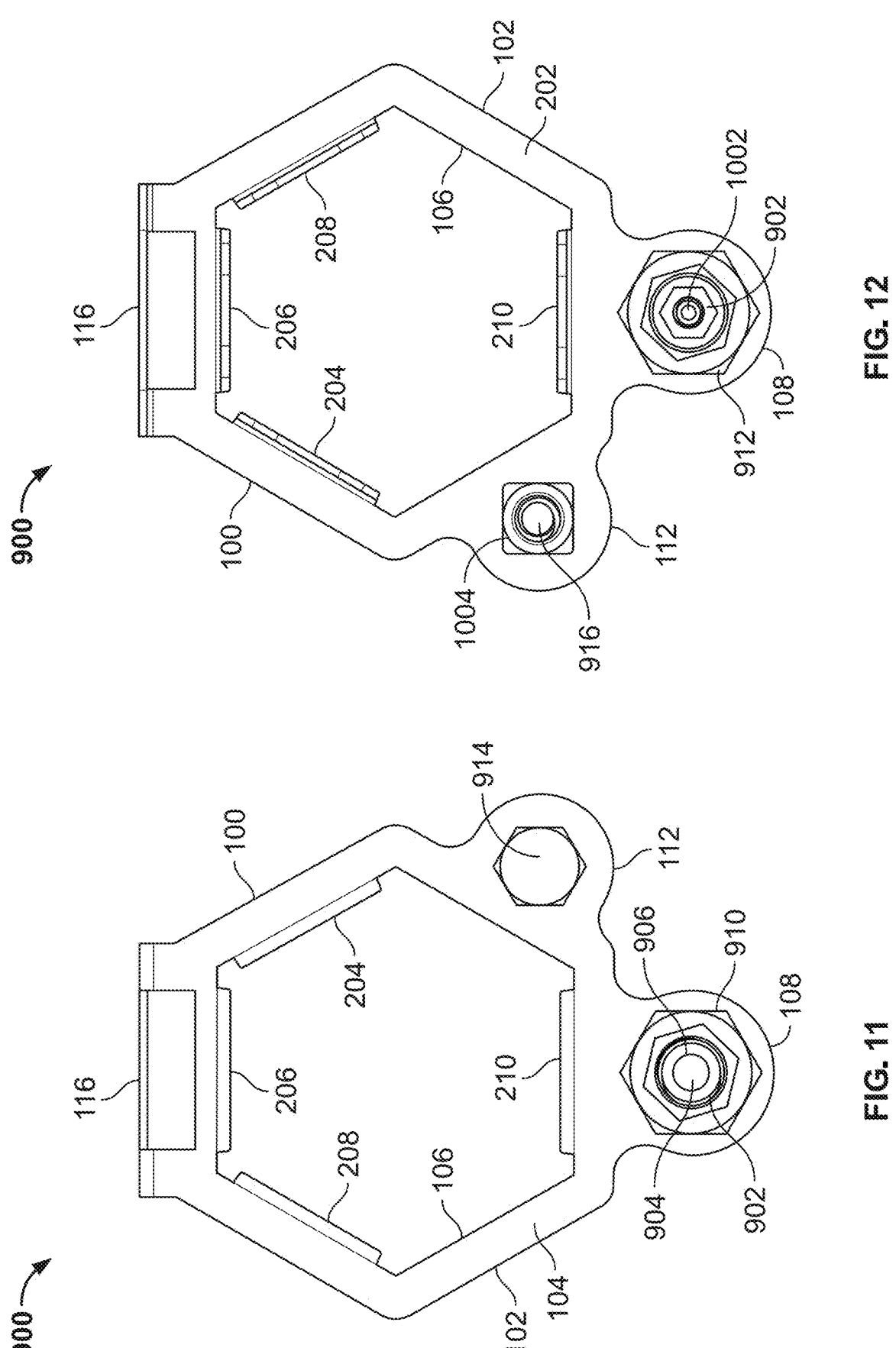
FIG. 11 is a front view of the mounting bracket assembly of FIGS. 9 and 10.
FIG. 12 is a rear view of the mounting bracket assembly of FIGS. 9-11.
Figures 13, 14:
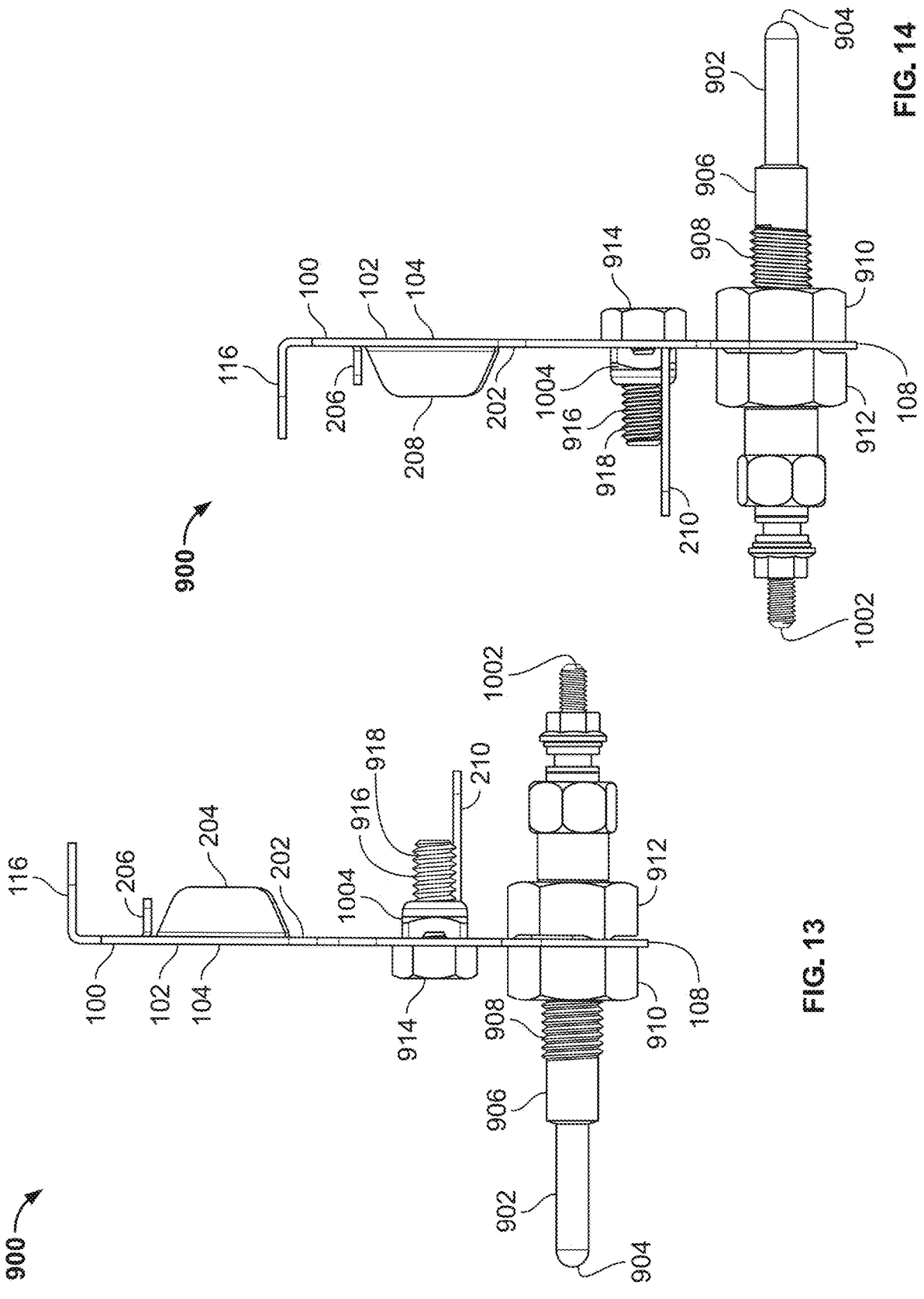
FIG. 13 is a right side view of the mounting bracket assembly of FIGS. 9-12.
FIG. 14 is a left side view of the mounting bracket assembly of FIGS. 9-13.
Figures 15, 16:
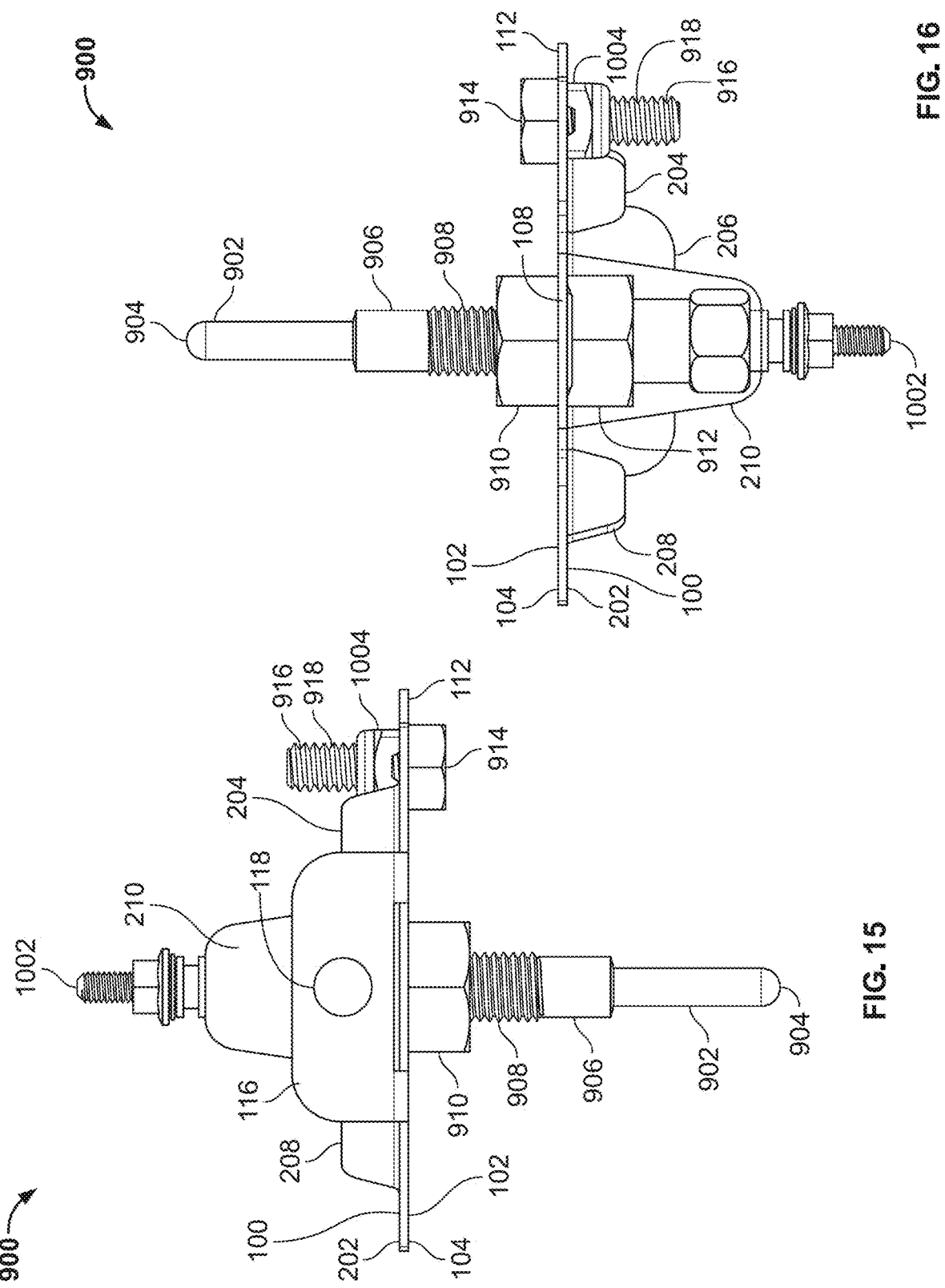
FIG. 15 is a top view of the mounting bracket assembly of FIGS. 9-14.
FIG. 16 is a bottom view of the mounting bracket assembly of FIGS. 9-15.

FIG. 9 is a first perspective view of an example mounting bracket assembly 900 including the mounting bracket 100 of FIGS. 1-8 and an example ignitor 902. FIG. 10 is a second perspective view of the mounting bracket assembly 900 of FIG. 9. FIG. 11 is a front view of the mounting bracket assembly 900 of FIGS. 9 and 10. FIG. 12 is a rear view of the mounting bracket assembly 900 of FIGS. 9-11. FIG. 13 is a right side view of the mounting bracket assembly 900 of FIGS. 9-12. FIG. 14 is a left side view of the mounting bracket assembly 900 of FIGS. 9-13. FIG. 15 is a top view of the mounting bracket assembly 900 of FIGS. 9-14. FIG. 16 is a bottom view of the mounting bracket assembly 900 of FIGS. 9-15.

The ignitor 902 of FIGS. 9-16 includes an example first end 904, an example second end 1002 located opposite the first end 904, and an example shaft 906 extending between the first end 904 and the second end 1002. The shaft 906 of the ignitor 902 is configured to be received in and/or to extend through the ignitor tab opening 110 of the ignitor tab 108 of the mounting bracket 100. In the illustrated example of FIGS. 9-16, the shaft 906 of the ignitor 902 includes an example threaded portion 908 configured to engage and/or threadedly mate with a threaded opening of an example first ignitor tab nut 910 and/or a threaded opening of an example second ignitor tab nut 912 to removably couple and/or removably fasten the ignitor 902 to the ignitor tab 108 of the mounting bracket 100. In some examples, the first ignitor tab nut 910 and/or the second ignitor tab nut 912 is/are permanently coupled (e.g., welded or otherwise permanently bonded) to the ignitor tab 108 of the mounting bracket 100 such that the first ignitor tab nut 910 and/or the second ignitor tab nut 912 is/are not removable from the ignitor tab 108. In the illustrated example of FIGS. 9-16, the ignitor 902 is configured as a DC-powered glow plug, with the first end 904 of the ignitor 902 being configured to extend into a burn pot of a pellet grill, as further described below. The ignitor 902 of FIGS. 9-16 is further configured to be powered via one or more power wire(s) (e.g., a positive wire, a negative wire, etc.) of a pellet grill, with the power wire(s) being coupled to the second end 1002, the shaft 906, and/or some other portion of the ignitor 902.

The mounting bracket assembly 900 of FIGS. 9-16 further includes an example grounding fastener 914 having an example shaft 916. The shaft 916 of the grounding fastener 914 is configured to be received in and/or to extend through the grounding tab opening 114 of the grounding tab 112 of the mounting bracket 100. In the illustrated example of FIGS. 9-16, the shaft 916 of the grounding fastener 914 includes an example threaded portion 918 configured to engage and/or threadedly mate with a threaded opening of an example grounding tab nut 1004 to removably couple and/or removably fasten the grounding fastener 914 to the grounding tab 112 of the mounting bracket 100. In some examples, the grounding tab nut 1004 is permanently coupled (e.g., welded or otherwise permanently bonded) to the grounding tab 112 of the mounting bracket 100 such that the grounding tab nut 1004 is not removable from the grounding tab 112. In the illustrated example of FIGS. 9-16, the grounding fastener 914 is configured as a bolt. In other examples, the grounding fastener 914 can instead be configured as a screw, or some other type of fastener that facilitates removably coupling the grounding fastener 914 to the grounding tab 112. The grounding faster 914 of FIGS. 9-16 is further configured to be connected to and/or contacted by a ground wire of a pellet grill.

Figure 17:
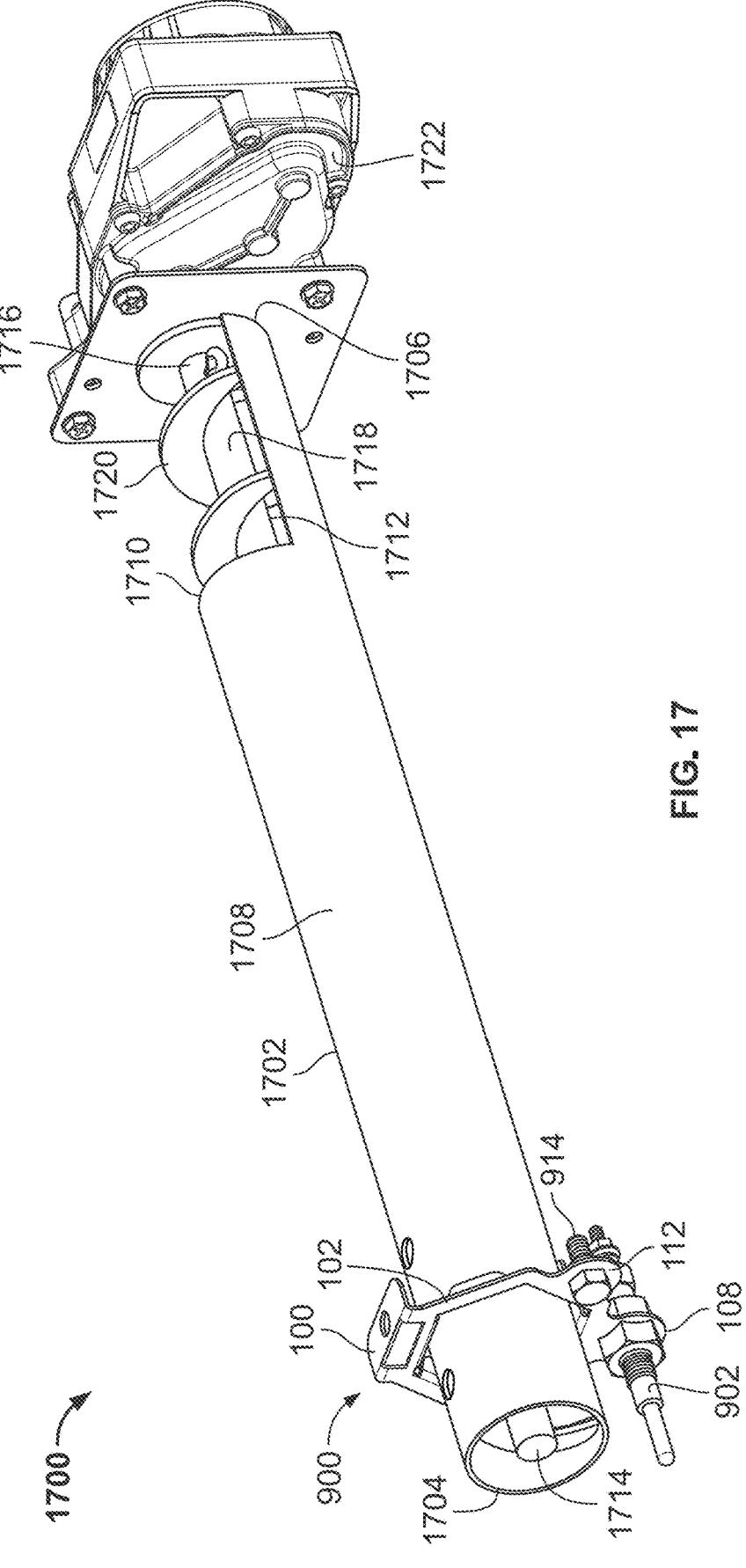
FIG. 17 is a perspective view of the mounting bracket assembly of FIGS. 9-16 coupled to an example auger assembly.
Figures 18, 19:
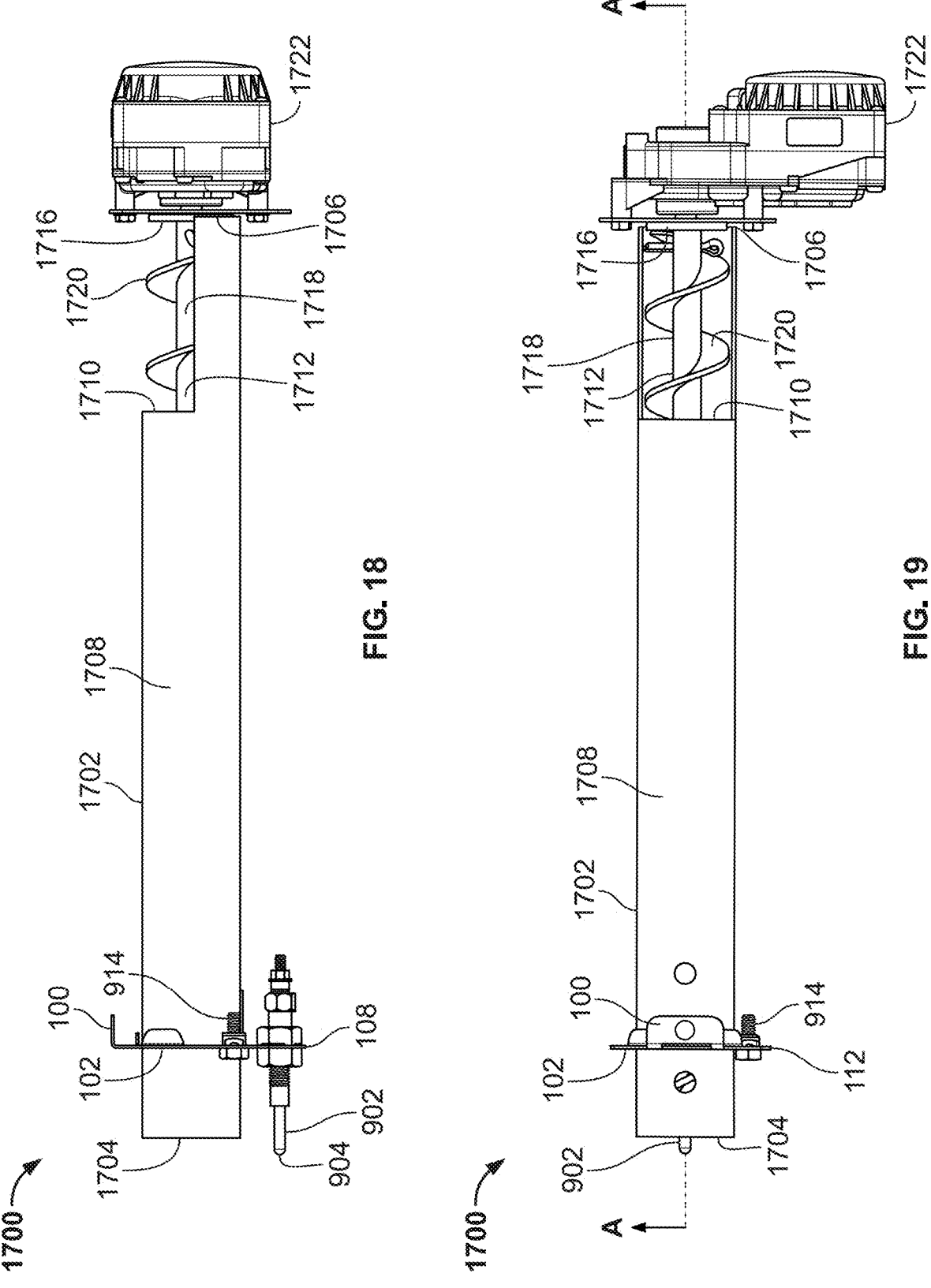
FIG. 18 is a right side view of the mounting bracket assembly of FIGS. 9-17 and the auger assembly of FIG. 17.
FIG. 19 is a top view of the mounting bracket assembly of FIGS. 9-18 and the auger assembly of FIGS. 17 and 18.
Figure 20:
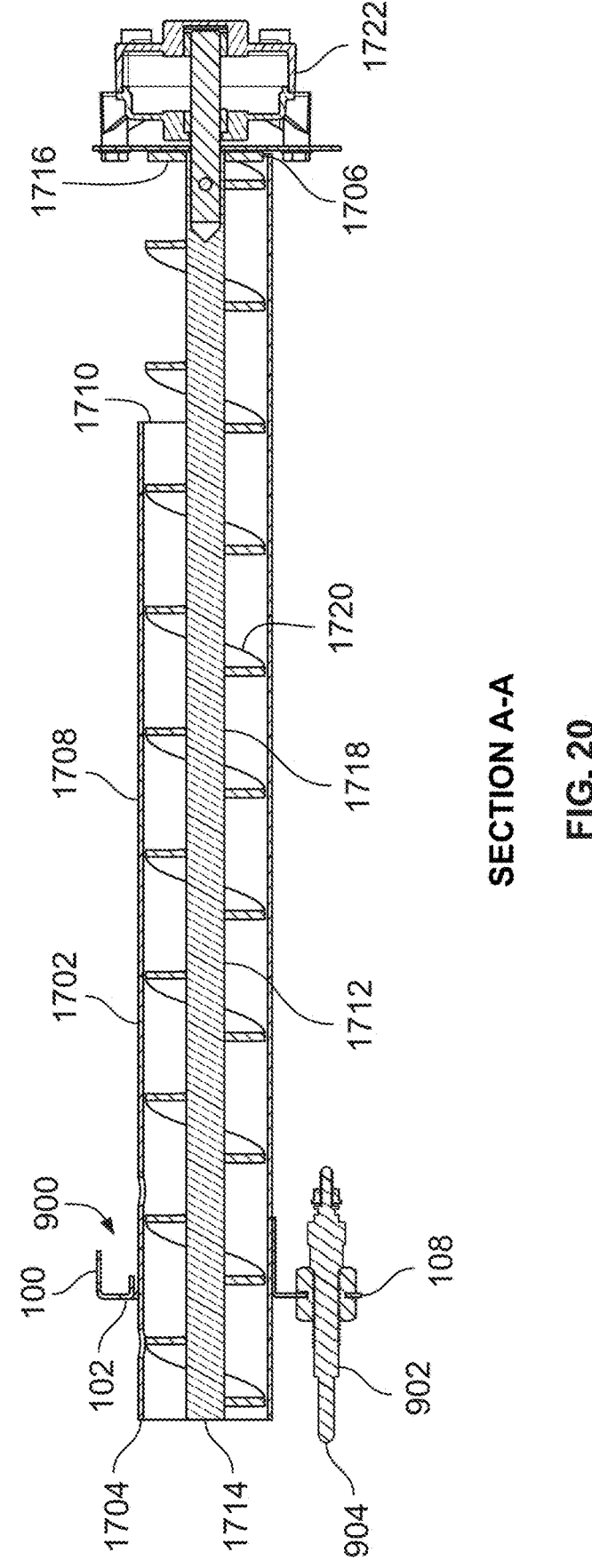
FIG. 20 is a cross-sectional view of the mounting bracket assembly of FIGS. 9-19 and the auger assembly of FIGS. 17-19 taken along section A-A of FIG. 19.

FIG. 17 is a perspective view of the mounting bracket assembly 900 of FIGS. 9-16 coupled to an example auger assembly 1700. FIG. 18 is a right side view of the mounting bracket assembly 900 of FIGS. 9-17 and the auger assembly 1700 of FIG. 17. FIG. 19 is a top view of the mounting bracket assembly 900 of FIGS. 9-18 and the auger assembly 1700 of FIGS. 17 and 18. FIG. 20 is a cross-sectional view of the mounting bracket assembly 900 of FIGS. 9-19 and the auger assembly 1700 of FIGS. 17-19 taken along section A-A of FIG. 19.

The auger assembly 1700 of FIGS. 17-20 is configured to extend between a hopper and a burn pot of a pellet grill, as further described below. In the illustrated example of FIGS. 17-20, the auger assembly 1700 includes an example auger tube 1702 having an example first end 1704, an example second end 1706 located opposite the first end 1704, and an example sidewall 1708 extending between the first end 1704 and the second end 1706. The first end 1704 of the auger tube 1702 and the second end 1706 of the auger tube 1702 are open. The first end 1704 of the auger tube 1702 is configured to be received in and/or to extend through an opening formed in a sidewall of a burn pot of a pellet grill, as further described below. The second end 1706 of the auger tube 1702 is configured to be positioned against a mounting plate of a pellet grill. The auger tube 1702 of FIGS. 17-20 further includes an example opening 1710 formed in and extending through the sidewall 1708 of the auger tube 1702, with the opening 1710 being configured to receive pellet fuel (e.g., wood pellets) from a hopper of a pellet grill, as further described below.

The auger assembly of FIGS. 17-20 further includes an example auger 1712 located within and/or circumscribed by the auger tube 1702. In the illustrated example of FIGS. 17-20, the auger 1712 includes an example first end 1714, an example second end 1716 located opposite the first end 1714, an example shaft 1718 extending between the first end 1714 and the second end 1716, and an example flighting 1720 extending along and projecting in a radially outward direction away from the shaft 1718. The first end 1714 of the auger 1712 terminates at or adjacent the first end 1704 of the auger tube 1702. The second end 1716 of the auger 1712 is configured to extend to and/or through a mounting plate of a pellet grill, and/or to extend to an output shaft of an example auger motor 1722 of the auger assembly 1700. The auger 1712 of FIGS. 17-20 is configured to engage with pellet fuel received (e.g., via the opening 1710 formed in the sidewall 1708 of the auger tube 1702) from a hopper of a pellet grill, and to transport the received pellet fuel away from the second end 1706 of the auger tube 1702 (e.g., away from the second end 1716 of the auger 1712), toward the first end 1704 of the auger tube 1702 (e.g., toward the first end 1714 of the auger 1712), and/or into a burn pot of a pellet grill. The auger 1712 of FIGS. 17-20 is further configured to be driven (e.g., rotated) in a controlled manner by the auger motor 1722, thereby controlling the rate at which pellet fuel is transported by the auger 1712, through the auger tube 1702, from a hopper of a pellet grill to a burn pot of the pellet grill. In some examples, the auger motor 1722 is configured as a DC-powered variable rate electric motor.

In the illustrated example of FIGS. 17-20, the auger tube 1702 of the auger assembly 1700 is received in and extends through the primary opening 106 of the mounting bracket 100 such that the base 102 of the mounting bracket 100 circumscribes the auger tube 1702. When the mounting bracket 100 and/or the mounting bracket assembly 900 is/are positioned as shown in FIGS. 17-20, one or more of the first support tab 204, the second support tab 206, the third support tab 208, and the fourth support tab 210 of the mounting bracket 100 may contact and/or engage the sidewall 1708 of the auger tube 1702 to support the mounting bracket 100 and/or the mounting bracket assembly 900 relative to the auger tube 1702.

As shown in FIGS. 17-20, the ignitor 902 of the mounting bracket assembly 900 is located below the auger tube 1702 of the auger assembly 1700, with the first end 904 of the ignitor 902 extending forward of and/or past the first end 1704 of the auger tube 1702, and/or with the first end 904 of the ignitor 902 extending forward of and/or past the first end 1714 of the auger 1712. The mounting bracket 100 and/or the mounting bracket assembly 900 is/are located along the auger tube 1702 such that the first end 904 of the ignitor 902 is capable of extending into a burn pot of the pellet grill via an opening formed in a sidewall of the burn pot of the pellet grill when the burn pot is coupled to the auger assembly 1700, as further described below. The mounting bracket 100 and/or the mounting bracket assembly 900 is/are slidably removable from the auger tube 1702 and/or, more generally, from the auger assembly 1700 of FIGS. 17-20 via the first end 1704 of the auger tube 1702 when the first end 1704 of the auger tube 1702 is not received in and/or is not extending into a burn pot of a pellet grill (e.g., when the burn pot is removed from and/or not coupled to the auger assembly 1700).

Figure 21:
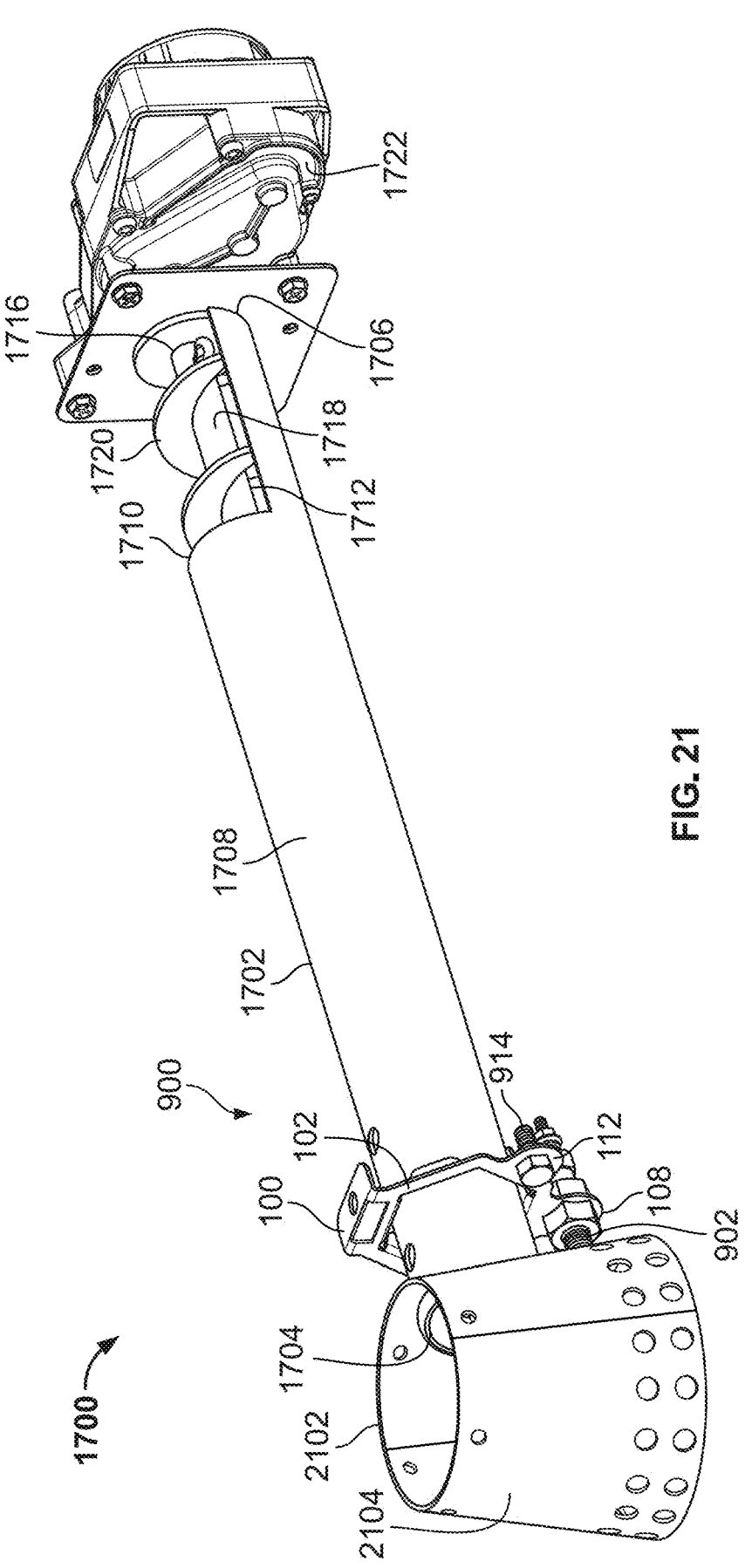
FIG. 21 is a perspective view of the mounting bracket assembly of FIGS. 9-20, the auger assembly of FIGS. 17-20, and an example burn pot.
Figures 22, 23:
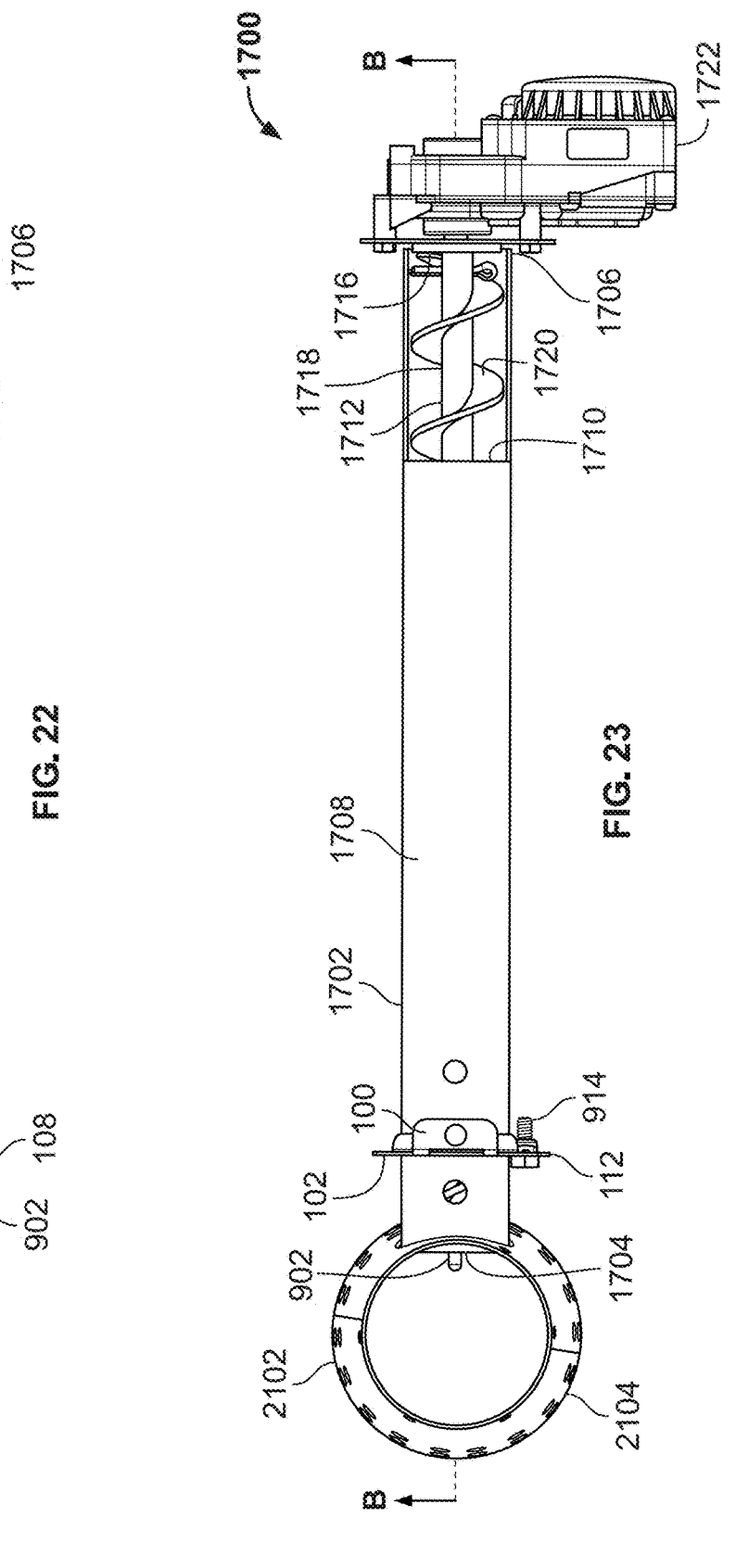
FIG. 22 is a right side view of the mounting bracket assembly of FIGS. 9-21, the auger assembly of FIGS. 17-21, and the burn pot of FIG. 21.
FIG. 23 is a top view of the mounting bracket assembly of FIGS. 9-22, the auger assembly of FIGS. 17-22, and the burn pot of FIGS. 21 and 22.
Figure 24:
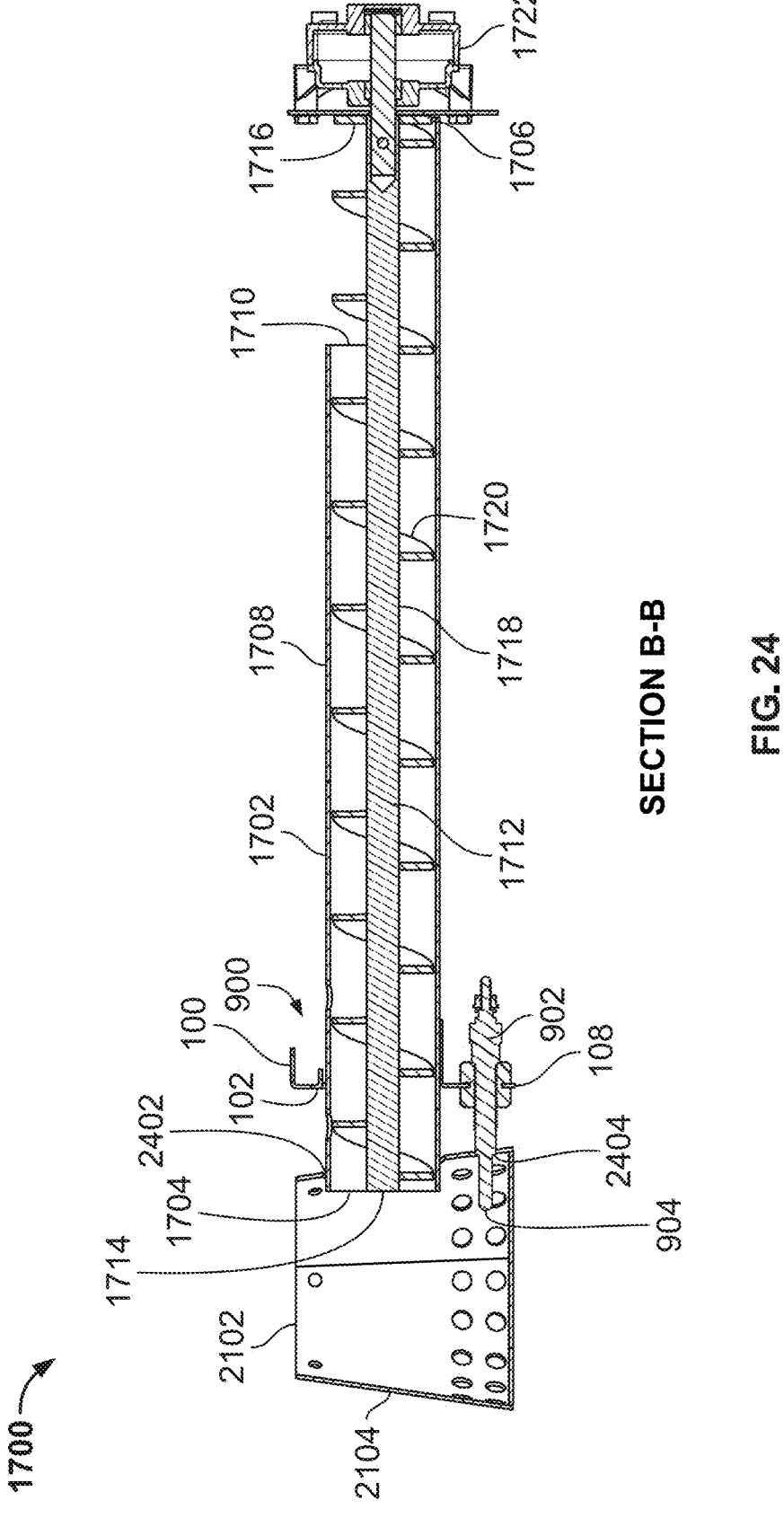
FIG. 24 is a cross-sectional view of the mounting bracket assembly of FIGS. 9-23, the auger assembly of FIGS. 17-23, and the burn pot of FIGS. 21-23.

FIG. 21 is a perspective view of the mounting bracket assembly 900 of FIGS. 9-20, the auger assembly 1700 of FIGS. 17-20, and an example burn pot 2102. FIG. 22 is a right side view of the mounting bracket assembly 900 of FIGS. 9-21, the auger assembly 1700 of FIGS. 17-21, and the burn pot 2102 of FIG. 21. FIG. 23 is a top view of the mounting bracket assembly 900 of FIGS. 9-22, the auger assembly 1700 of FIGS. 17-22, and the burn pot 2102 of FIGS. 21 and 22. FIG. 24 is a cross-sectional view of the mounting bracket assembly 900 of FIGS. 9-23, the auger assembly 1700 of FIGS. 17-23, and the burn pot 2102 of FIGS. 21-23.

In the illustrated example of FIGS. 21-24, the burn pot 2102 includes an example sidewall 2104 extending between a top end (e.g., an open top end) and a bottom end (e.g., a closed or partially open bottom end) of the burn pot 2102. The burn pot 2102 of FIGS. 21-24 further includes an example first opening 2402 formed in and extending through the sidewall 2104 of the burn pot 2102. The first opening 2402 of the sidewall 2104 of the burn pot 2102 is configured to receive the sidewall 1708 of the auger tube 1702 of the auger assembly 1700 such that sidewall 1708 of the auger tube 1702 is located within and/or extends through the first opening 2402 of the sidewall 2104 of the burn pot 2102, and/or such that the first end 1704 of the auger tube 1702 extends into the burn pot 2102. The burn pot 2102 of FIGS. 21-24 further includes an example second opening 2404 formed in and extending through the sidewall 2104 of the burn pot 2102. The second opening 2404 of the sidewall 2104 of the burn pot 2102 is configured to receive the shaft 906 of the ignitor 902 of the mounting bracket assembly 900 such that shaft 906 of the ignitor 902 is located within and/or extends through the second opening 2404 of the sidewall 2104 of the burn pot 2102, and/or such that the first end 904 of the ignitor 902 extends into the burn pot 2102.

The burn pot 2102 of FIGS. 21-24 is removably couplable to the mounting bracket assembly 900 and/or to the auger assembly 1700. For example, the burn pot 2102 can be coupled to the mounting bracket assembly 900 by sliding the burn pot 2102 toward the mounting bracket assembly 900 such that first end 904 and/or the shaft 906 of the ignitor 902 of the mounting bracket assembly 900 slides into the first opening 2402 of the sidewall 2104 of the burn pot 2102. Similarly, the burn pot 2102 can be coupled to the auger assembly 1700 by sliding the burn pot 2102 toward the auger assembly 1700 such that the first end 1704 and/or the sidewall 1708 of the auger tube 1702 slides into the second opening 2404 of the sidewall 2104 of the burn pot 2102. Conversely, the burn pot 2102 can be uncoupled from and/or removed from the mounting bracket assembly 900 and the auger assembly 1700 by sliding the burn pot 2102 away from the mounting bracket assembly 900 and away from the auger assembly 1700, such that the first end 904 and/or the shaft 906 of the ignitor 902 of the mounting bracket assembly 900 slides out or is otherwise removed from the first opening 2402 of the sidewall 2104 of the burn pot 2102, and such that the first end 1704 and/or the sidewall 1708 of the auger tube 1702 slides out or is otherwise removed from the second opening 2404 of the sidewall 2104 of the burn pot 2102. When the burn pot 2102 of FIGS. 21-24 is coupled to the mounting bracket assembly 900 and the auger assembly 1700 (e.g., as shown in FIGS. 21-24), the mounting bracket 100 of the mounting bracket assembly 900 cannot be removed from the auger tube 1702. Conversely, when the burn pot 2102 of FIGS. 21-24 is uncoupled from and/or removed from the mounting bracket assembly 900 and the auger assembly 1700 (e.g., as shown in FIGS. 17-20), the mounting bracket 100 of the mounting bracket assembly 900 can be removed from the auger tube 1702 by sliding the mounting bracket 100 and/or the mounting bracket assembly 900 off of the first end 1704 of the auger tube 1702.

Figure 25:
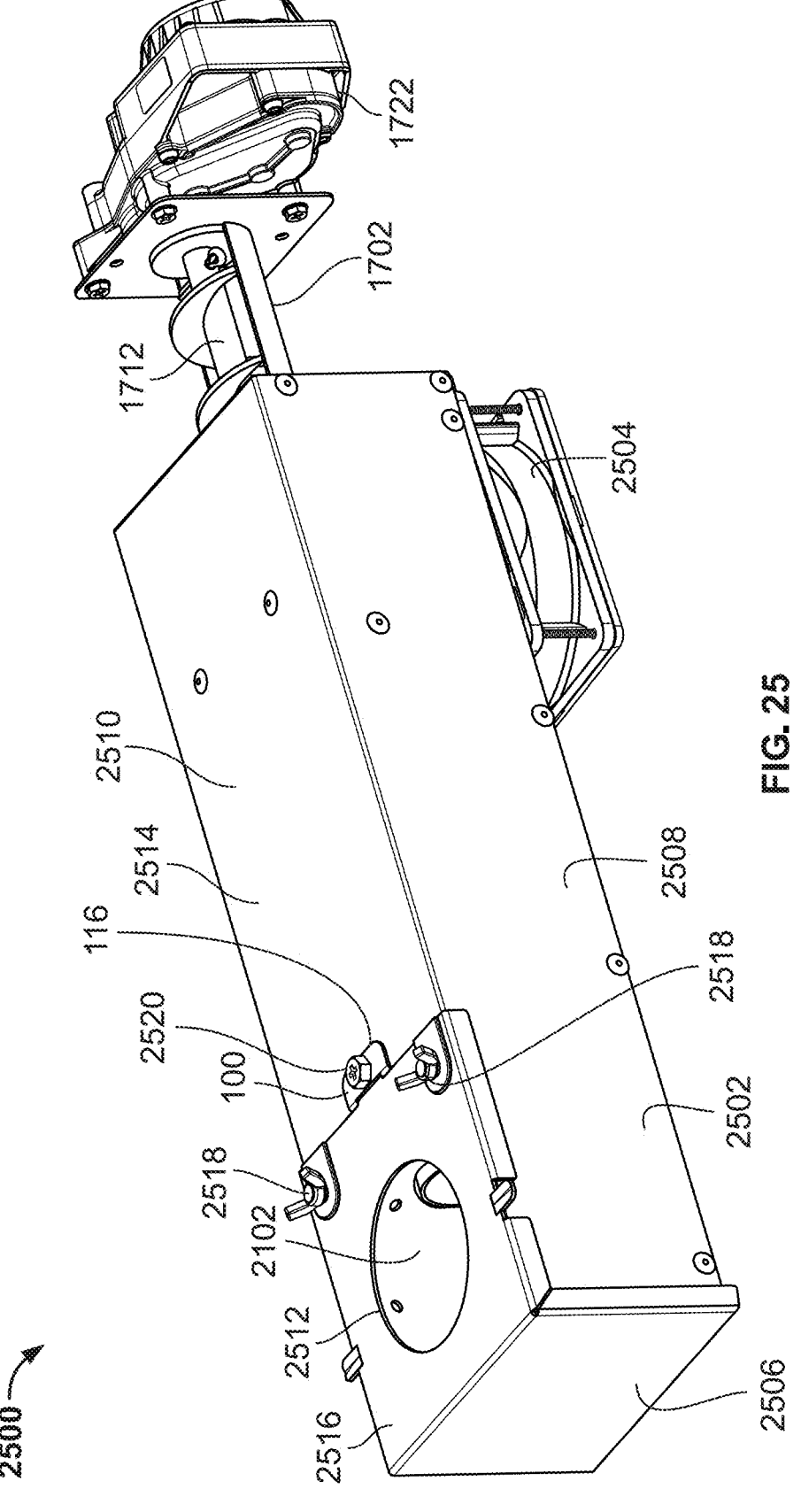
FIG. 25 is a perspective view of an example engine assembly including the mounting bracket assembly of FIGS. 9-24, the auger assembly of FIGS. 17-24, and the burn pot of FIGS. 21-24.
Figure 26:
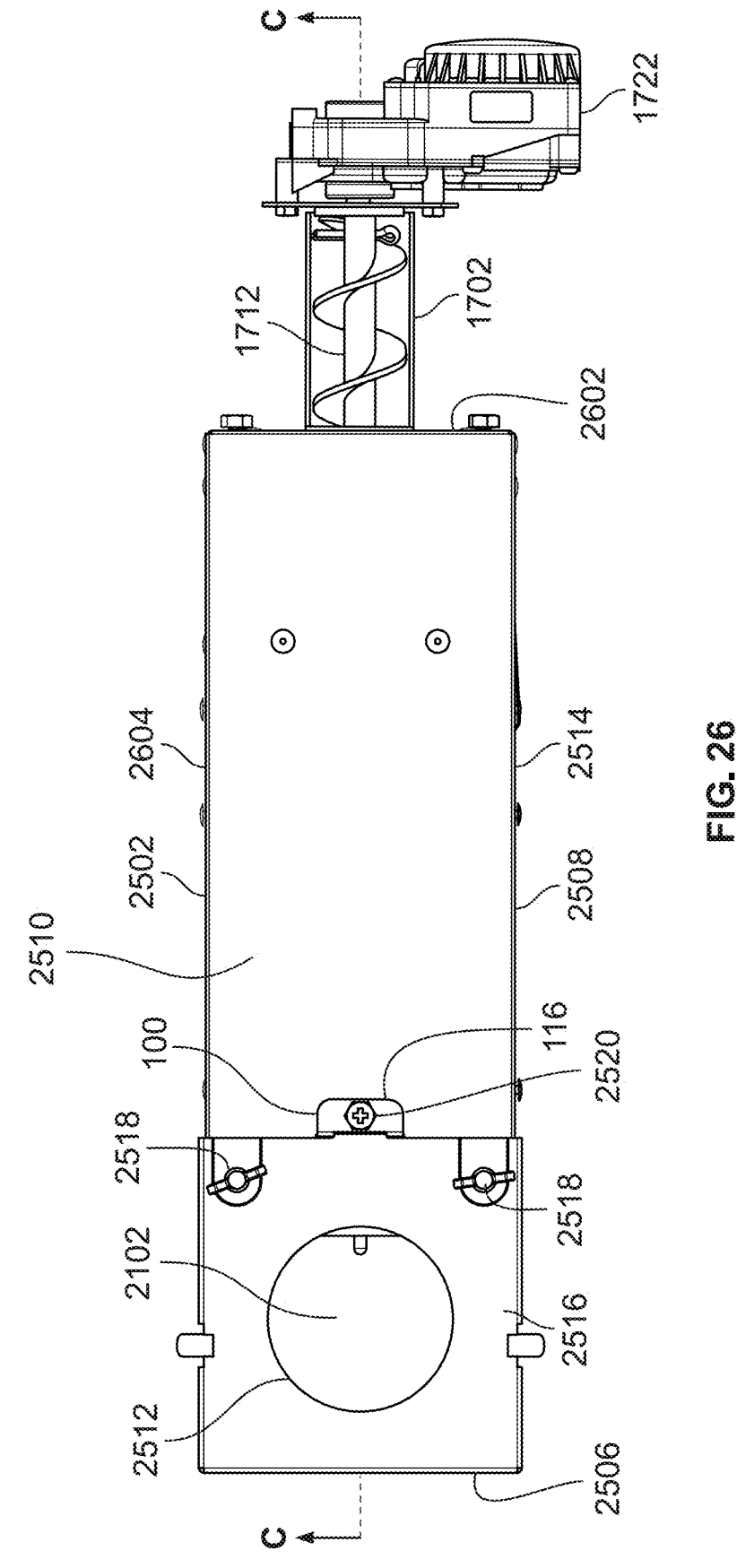
FIG. 26 is a top view of the engine assembly of FIG. 25.
Figure 27:
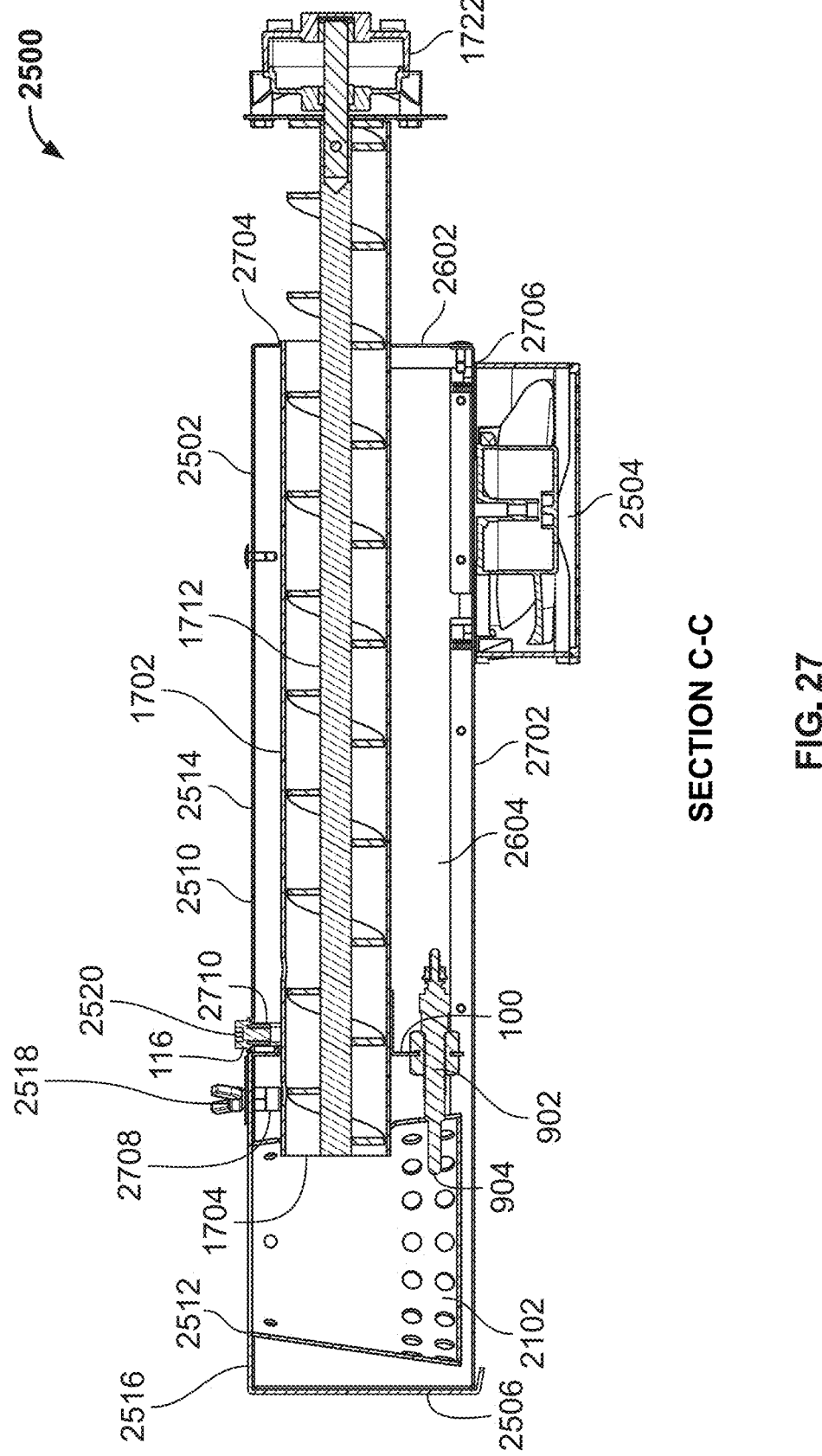
FIG. 27 is a cross-sectional view of the engine assembly of FIGS. 25 and 26 taken along section C-C of FIG. 26.

FIG. 25 is a perspective view of an example engine assembly 2500 including the mounting bracket assembly 900 of FIGS. 9-24, the auger assembly 1700 of FIGS. 17-24, and the burn pot 2102 of FIGS. 21-24. FIG. 26 is a top view of the engine assembly 2500 of FIG. 25. FIG. 27 is a cross-sectional view of the engine assembly 2500 of FIGS. 25 and 26 taken along section C-C of FIG. 26. In addition to including the mounting bracket assembly 900, the auger assembly 1700, and the burn pot 2102, the engine assembly of FIGS. 25-27 further includes an example housing 2502 and an example fan 2504. The housing 2502 of the engine assembly 2500 contains, encloses, and/or carries at least a portion of the mounting bracket assembly 900, at least a portion of the auger assembly 1700, and at least a portion of the burn pot 2102. For example, as shown in FIGS. 25-27, at least the base 102, the ignitor tab 108, the grounding tab 112, the first support tab 204, the second support tab 206, the third support tab 208, the fourth support tab 210, the ignitor 902, the first ignitor tab nut 910, the second ignitor tab nut 912, the grounding fastener 914, and the grounding tab nut 1004 of the mounting bracket assembly 900 are all located within the housing 2502, as are portions of the auger tube 1702 and the auger 1712 of the auger assembly 1700, and as is the entirety of the burn pot 2102. The fan 2504 is coupled to an external surface (e.g., a bottom surface) of the housing 2502, with the fan 2504 being configured to draw and/or propel air into the housing 2502, and to generate an airflow that moves from within the housing 2502 toward and/or into the burn pot 2102, thereby controlling the rate at which pellet fuel is combusted within the burn pot 2102. In some examples, the fan 2504 is configured as a DC-powered variable rate electric fan.

In the illustrated example of FIGS. 25-27, the housing 2502 of the engine assembly 2500 is a hollow, box-shaped structure that includes an example front wall 2506, an example rear wall 2602, an example right side wall 2508, an example left side wall 2604, an example top wall 2510, and an example bottom wall 2702. The housing 2502 of FIGS. 25-27 includes an example first opening 2704 formed in and extending through the rear wall 2602 of the housing 2502. The first opening 2704 is configured to receive the auger tube 1702 of the auger assembly 1700 such that the auger tube 1702 extends through the rear wall 2602 of the housing 2502 via the first opening 2704. The housing 2502 of FIGS. 25-27 further includes an example second opening 2512 formed in and extending through the top wall 2510 of the housing 2502. The second opening 2512 is configured to allow heat generated within the burn pot 2102 to escape the burn pot 2102 and/or to be distributed into a cooking chamber of a pellet grill within which the burn pot is located. The housing 2502 of FIGS. 25-27 further includes an example third opening 2706 formed in and extending through the bottom wall 2702 of the housing 2502. The third opening 2706 is configured to allow air generated by the fan 2504 to be drawn and/or propelled into the housing 2502.

The housing 2502 of FIGS. 25-27 is separable into an example stationary portion 2514 and an example cover 2516, with the cover 2516 being removably coupled to the stationary portion 2514. In the illustrated example, the stationary portion 2514 of the housing 2502 is formed by the rear wall 2602, the right side wall 2508, the left side wall 2604, a portion of the top wall 2510, and the bottom wall 2702 of the housing 2502. The cover 2516 of the housing 2502 is formed by the front wall 2506 and a portion of the top wall 2510 of the housing 2502, with the cover including the second opening 2512 of the housing 2502 as described above.

In the illustrated example of FIGS. 25-27, the cover 2516 of the housing 2502 is removably coupled to the stationary portion 2514 of the housing 2502 via a pair of example cover fasteners 2518 and a corresponding pair of example cover nuts 2708. In some examples, the cover fasteners 2518 are configured as threaded fasteners (e.g., threaded bolts or threaded screws, such as thumbscrews), with the threaded portions of the cover fasteners 2518 further being configured to engage and/or threadedly mate with corresponding threaded openings of the corresponding cover nuts 2708 to removably couple and/or removably fasten the cover 2516 of the housing 2502 to the stationary portion 2514 of the housing 2502. In this regard, each one of the cover fasteners 2518 extends through a corresponding through hole of the cover 2516 and through a corresponding through hole of the stationary portion 2514 prior to the cover fastener 2518 engaging the corresponding cover nut 2708. As such, a solid portion of the cover 2516 surrounding the cover through hole and a solid portion of the stationary portion 2514 surrounding the stationary portion through hole become secured between a head of the cover fastener 2518 on the one hand and the corresponding cover nut 2708 on the other hand when the cover 2516 of the housing 2502 is coupled to the stationary portion 2514 of the housing 2502.

In some examples, the cover nuts 2708 are permanently coupled (e.g., welded or otherwise permanently bonded) to the top wall 2510 of the housing 2502 (e.g., to a portion of the top wall 2510 that forms the stationary portion 2514 of the housing 2502) such that the cover nuts 2708 are not removable from the top wall 2510 of the housing 2502. In the illustrated example of FIGS. 25-27, the cover 2516 is removably coupled to the stationary portion 2514 by two cover fasteners 2518 and two corresponding cover nuts 2708. In other examples, the cover 2516 can instead be removably coupled to the stationary portion 2514 by a different number (e.g., one, three, four, etc.) of cover fasteners 2518 and a corresponding number of cover nuts 2708.

In the illustrated example of FIGS. 25-27, the mounting bracket assembly 900 is removably coupled to the stationary portion 2514 of the housing 2502 via an example mounting fastener 2520 and an example mounting nut 2710. In some examples, the mounting fastener 2520 is configured as a threaded fastener (e.g., a threaded bolt or a threaded screw), with the threaded portion of the mounting fastener 2520 further being configured to engage and/or threadedly mate with a threaded opening of the mounting nut 2710 to removably couple and/or removably fasten the mounting bracket assembly 900 to the stationary portion 2514 of the housing 2502. In this regard, the mounting fastener 2520 extends through the mounting tab opening 118 of the mounting tab 116 of the mounting bracket assembly 900 and through a through hole of the stationary portion 2514 of the housing 2502 prior to the mounting fastener 2520 engaging the corresponding mounting nut 2710. As such, a solid portion of the mounting tab 116 surrounding the mounting tab opening 118 and a solid portion of the stationary portion 2514 surrounding the stationary portion through hole become secured between a head of the mounting fastener 2520 on the one hand and the corresponding mounting nut 2710 on the other hand when the mounting bracket assembly 900 is coupled to the stationary portion 2514 of the housing 2502.

In some examples, the mounting nut 2710 is permanently coupled (e.g., welded or otherwise permanently bonded) to the top wall 2510 of the housing 2502 (e.g., to a portion of the top wall 2510 that forms the stationary portion 2514 of the housing 2502) such that the mounting nut 2710 is not removable from the top wall 2510 of the housing 2502. In the illustrated example of FIGS. 25-27, the mounting bracket assembly 900 is removably coupled to the stationary portion 2514 by one mounting fasteners 2520 and one corresponding mounting nut 2710. In other examples, the mounting bracket assembly 900 can instead be removably coupled to the stationary portion 2514 by a different number (e.g., two, three, four, etc.) of mounting fasteners 2520 and a corresponding number of mounting nuts 2710.

Figure 28:
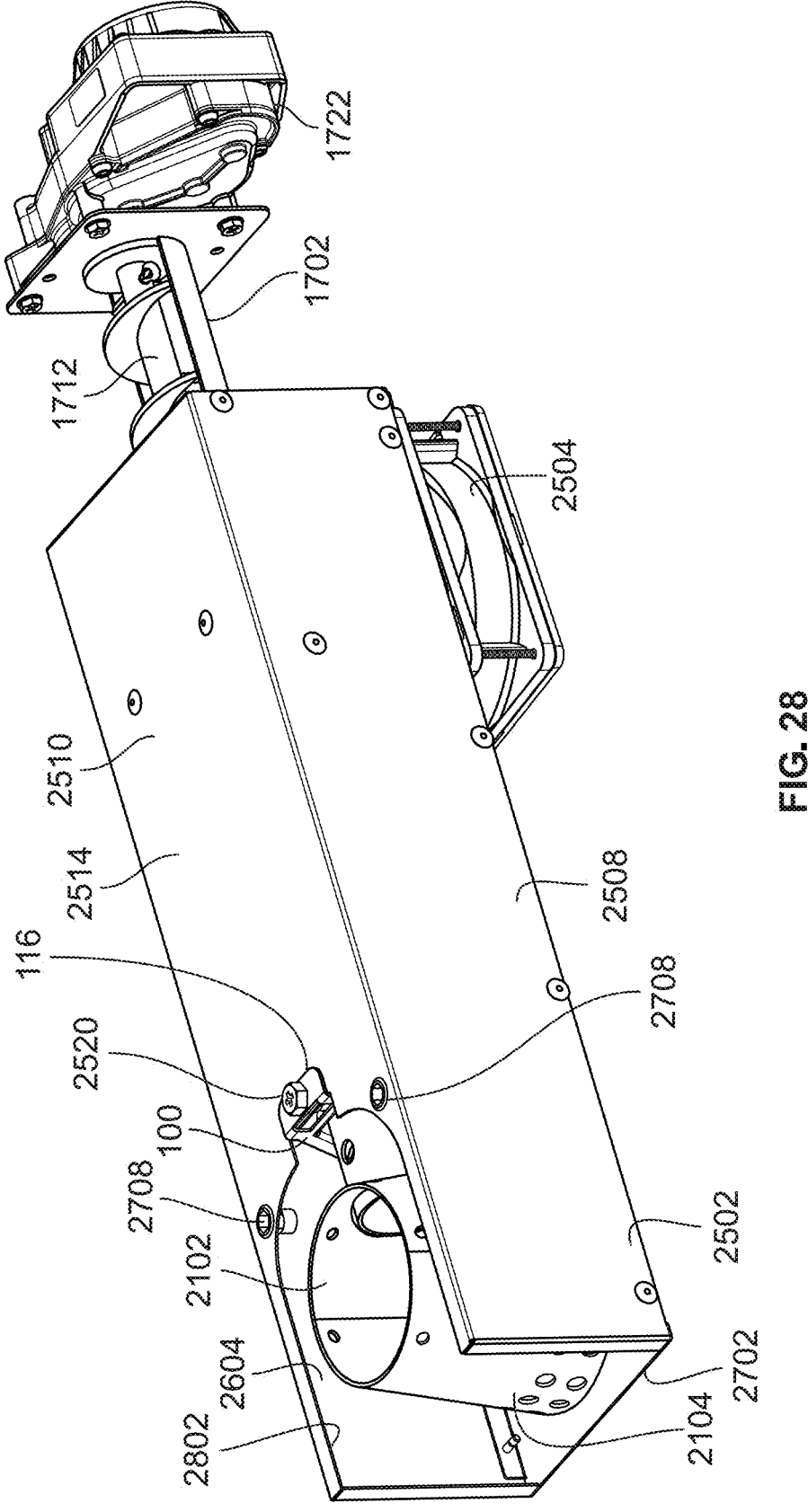
FIG. 28 is a perspective view of the engine assembly of FIGS. 25-27 with the cover of the engine assembly removed.

FIG. 28 is a perspective view of the engine assembly 2500 of FIGS. 25-27 with the cover 2516 of the engine assembly 2500 removed. As shown in FIG. 28, the housing 2502 of the engine assembly 2500 includes an example fourth opening 2802 when the cover 2516 of the housing 2502 is removed from the stationary portion 2514 of the housing 2502. For example, as shown in FIG. 28, the fourth opening 2802 occupies substantially the same portions of the front wall 2506 and the top wall 2510 of the housing 2502 that were formed by and/or occupied by the cover 2516 of the housing 2502 prior to the cover 2516 being removed from the stationary portion 2514 of the housing 2502. The fourth opening 2802 is configured to enable the burn pot 2102 to be slid and/or otherwise moved away from the mounting bracket assembly 900 and away from the auger assembly 1700, such that the burn pot 2102 can easily be uncoupled from and/or removed from the mounting bracket assembly 900 and the auger assembly 1700. In this regard, the fourth opening 2802 is configured such that the burn pot 2102 can easily be removed from the housing 2502 by sliding and/or otherwise moving the burn pot 2102 through the fourth opening 2802 when and/or as the cover 2516 of the housing 2502 is removed from the stationary portion 2514 of the housing 2502. In some examples, the cover 2516 and the burn pot 2102 are not permanently coupled to one another. In such examples, removal of the cover 2516 of the housing 2502 from the stationary portion 2514 of the housing 2502 occurs independently of removal of the burn pot 2102 from the housing 2502, with removal of the cover 2516 preceding removal of the burn pot 2102. In other examples, the cover 2516 and the burn pot 2102 are permanently coupled (e.g., welded) to one another. In such other examples, removal of the burn pot 2102 from the housing 2502 occurs concurrently with removal of the cover 2516 of the housing 2502 from the stationary portion 2514 of the housing 2502.

Figure 29:
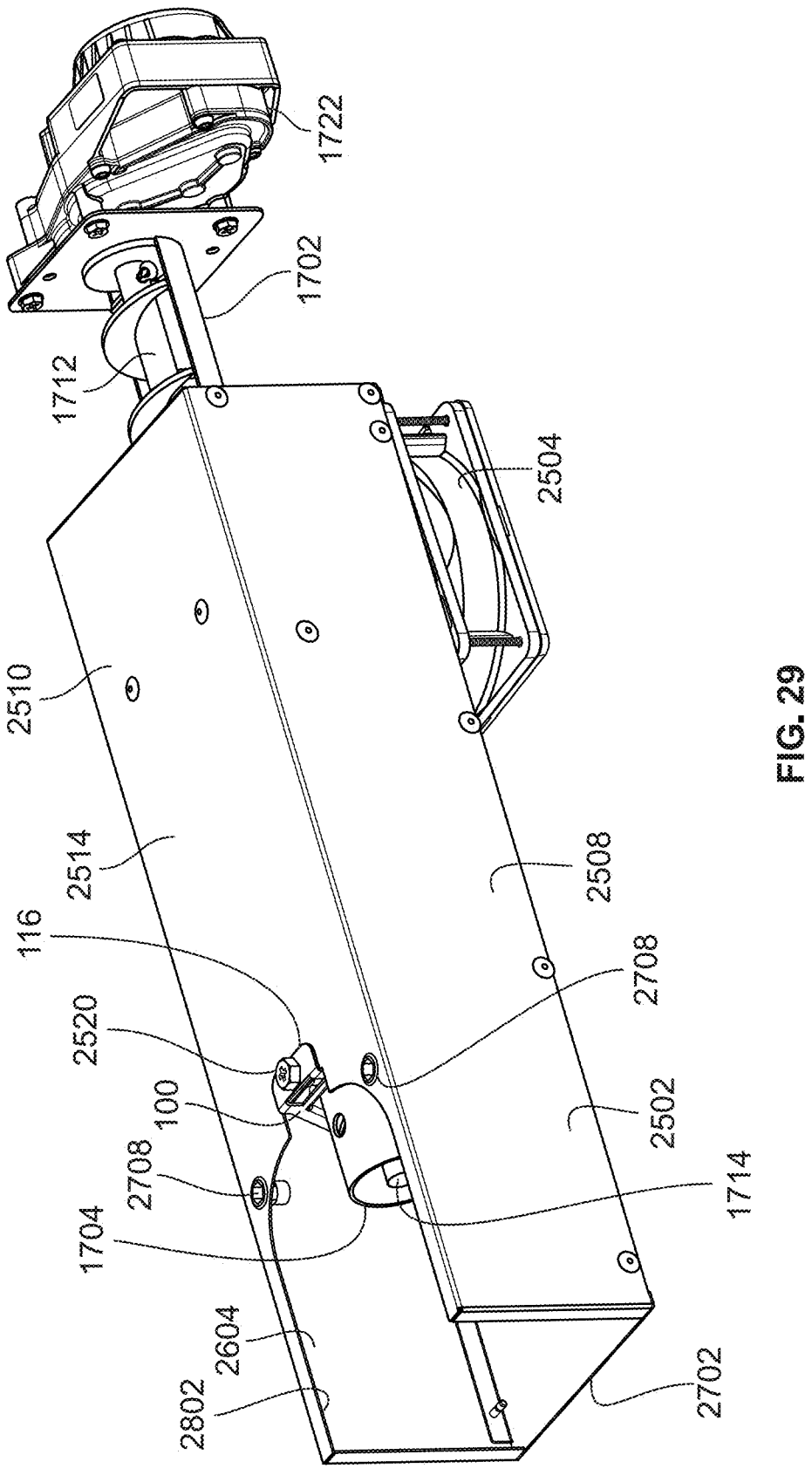
FIG. 29 is a perspective view of the engine assembly of FIGS. 25-28 with the cover and the burn pot of the engine assembly removed.
Figure 30:
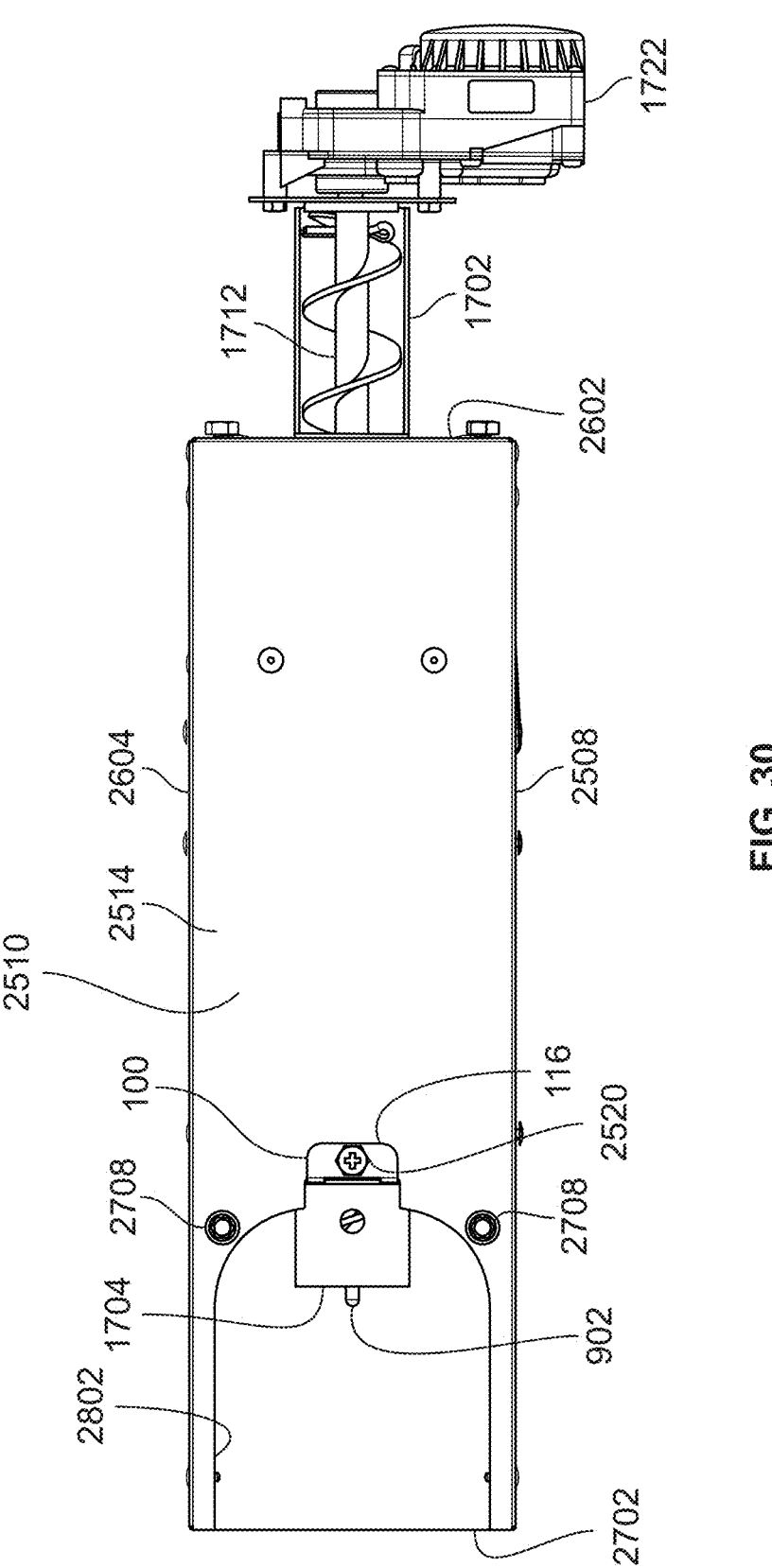
FIG. 30 is a top view of the engine assembly of FIGS. 25-29 with the cover and the burn pot of the engine assembly removed.
Figure 31:
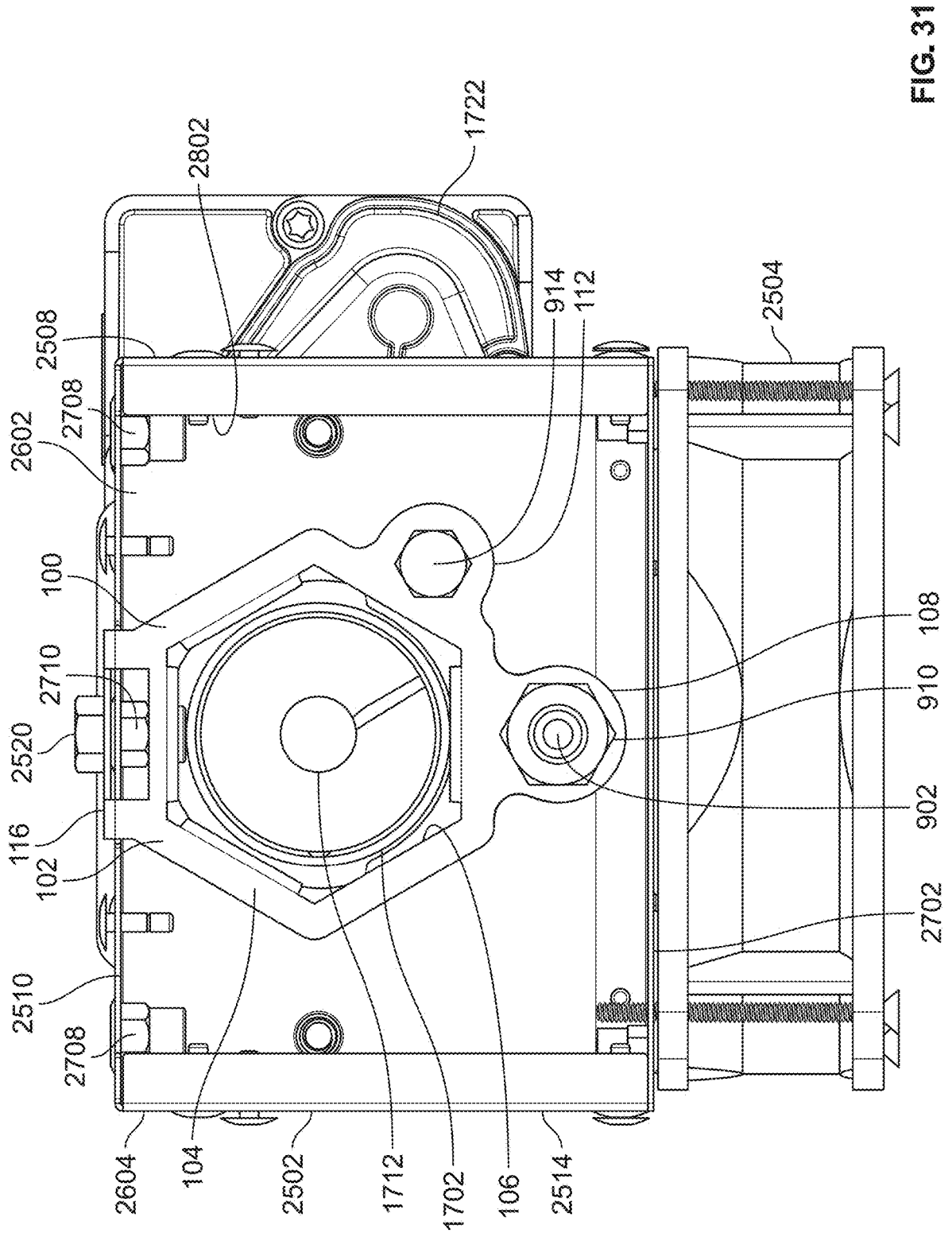
FIG. 31 is a front view of the engine assembly of FIGS. 25-30 with the cover and the burn pot of the engine assembly removed.

FIG. 29 is a perspective view of the engine assembly 2500 of FIGS. 25-28 with the cover 2516 and the burn pot 2102 of the engine assembly 2500 removed. FIG. 30 is a top view of the engine assembly 2500 of FIGS. 25-29 with the cover 2516 and the burn pot 2102 of the engine assembly 2500 removed. FIG. 31 is a front view of the engine assembly 2500 of FIGS. 25-30 with the cover 2516 and the burn pot 2102 of the engine assembly 2500 removed. As shown in FIGS. 29-31, the mounting bracket assembly 900 can be easily accessed once the cover 2516 and the burn pot 2102 of the engine assembly 2500 have been removed from the housing 2502 of the engine assembly 2500. In this regard, the mounting bracket 100 of the mounting bracket assembly 900 can be uncoupled from the stationary portion 2514 of the housing 2502 by removing the mounting fastener 2520 from the mounting nut 2710, and also from the mounting tab opening 118 formed in the mounting tab 116 of the mounting bracket 100. Once the mounting fastener 2520 has been removed from the mounting nut 2710 and the mounting tab opening 118, the mounting bracket 100 of the mounting bracket assembly 900 can thereafter easily be removed from the auger tube 1702 of the auger assembly 1700. For example, the mounting bracket 100 of the mounting bracket assembly 900 can be removed from the auger tube 1702 by sliding the mounting bracket 100 and/or the mounting bracket assembly 900 off of the first end 1704 of the auger tube 1702.

Figure 32:
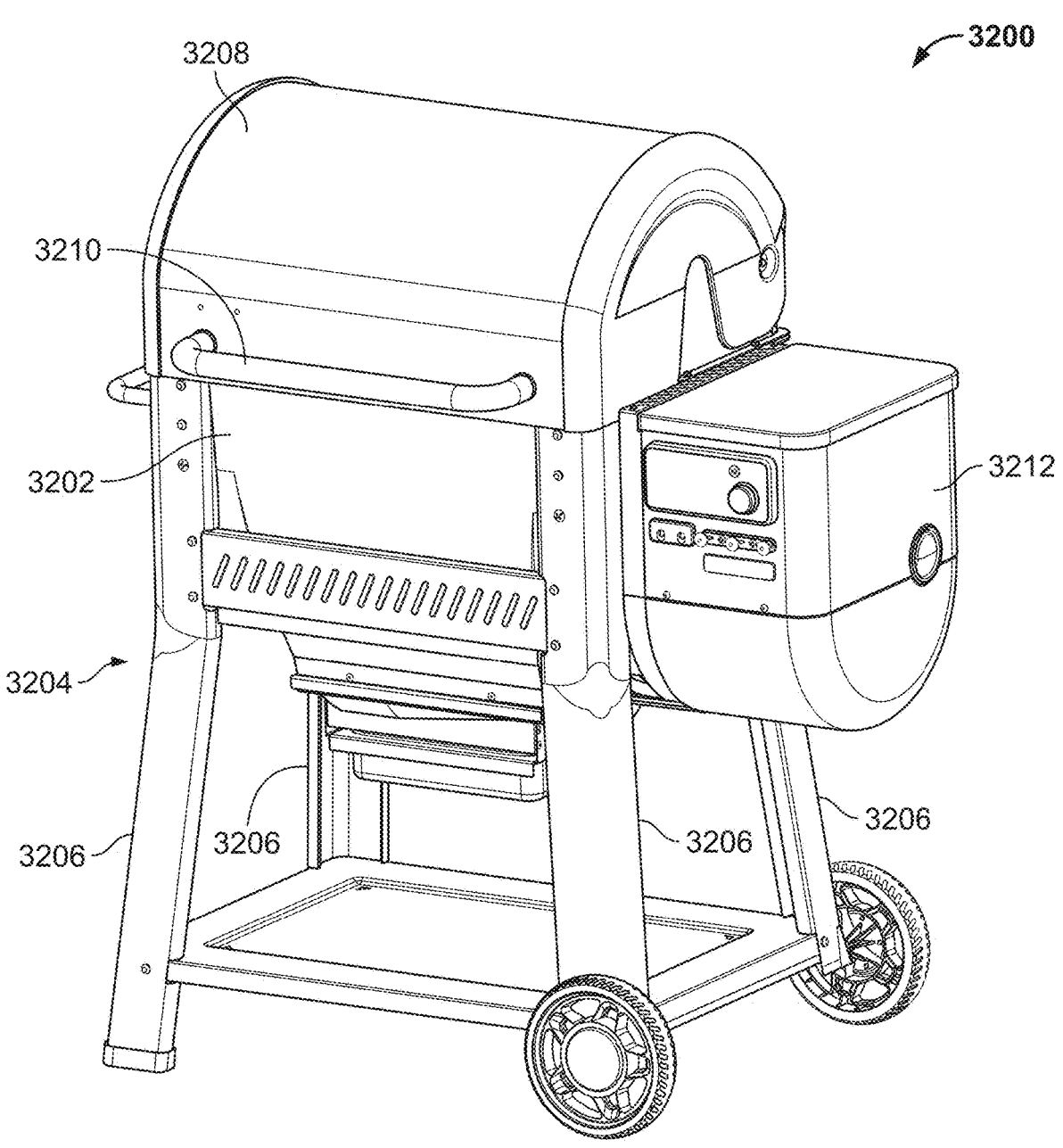
FIG. 32 is a perspective view of an example pellet grill including the engine assembly of FIGS. 25-31.
Figure 33:
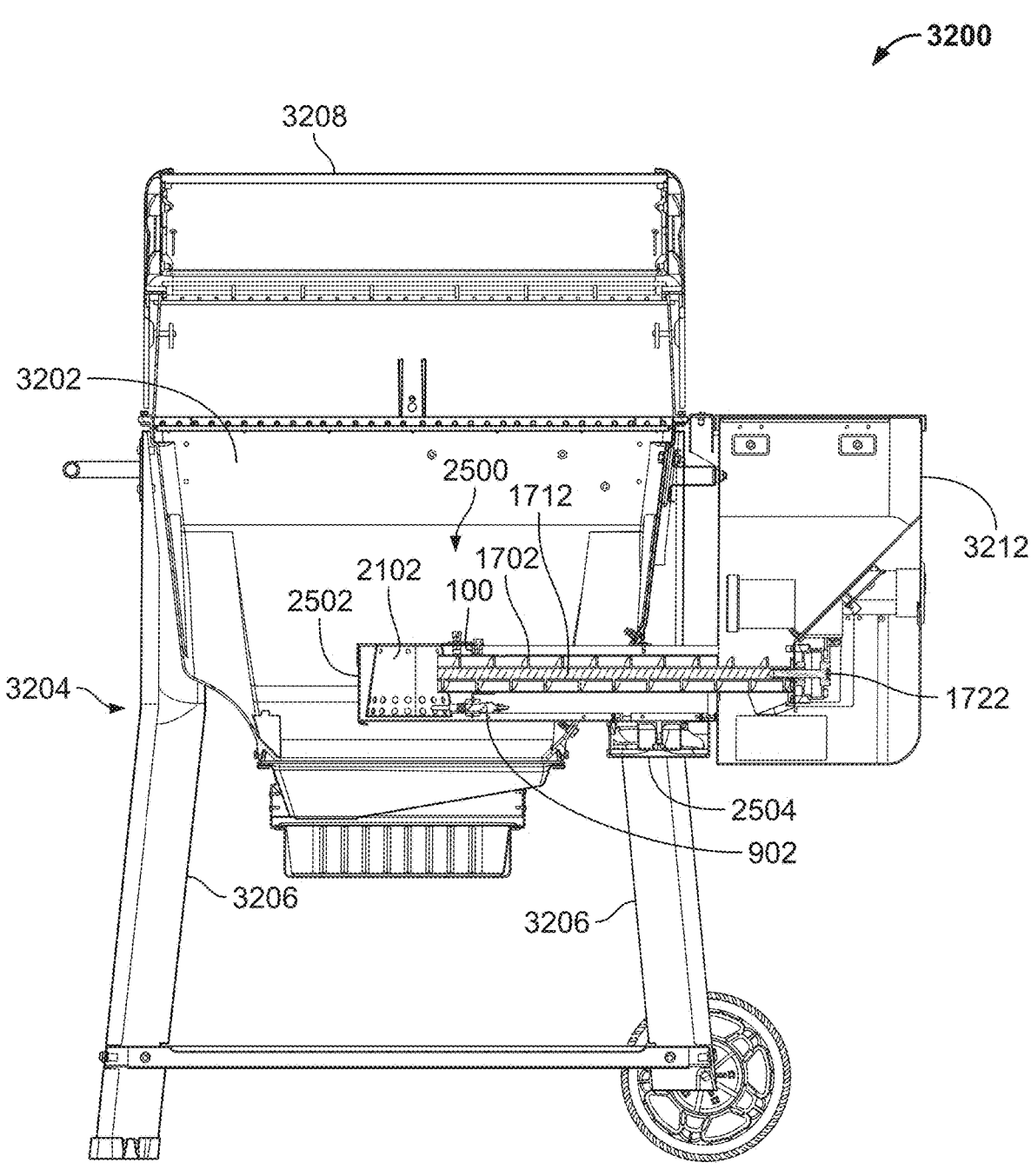
FIG. 33 is a partial cutaway view of the pellet grill of FIG. 32.

FIG. 32 is a perspective view of an example pellet grill 3200 including the engine assembly 2500 of FIGS. 25-31. FIG. 33 is a partial cutaway view of the pellet grill 3200 of FIG. 32. In the illustrated example of FIGS. 32 and 33, the engine assembly 2500 is partially located within an example cookbox 3202 of the pellet grill 3200, with the cookbox 3202 being configured to form a cooking chamber suitable for cooking one or more item(s) of food. In some examples, the cookbox 3202 of FIGS. 32 and 33 is further configured to house, carry, and/or support one or more cooking grate(s) located and/or positioned within the cookbox 3202 above the burn pot 2102 of the engine assembly 2500. In some examples, the cookbox 3202 of FIGS. 32 and 33 is further configured to house, carry, and/or support one or more grease deflector(s) and/or one or more heat diffuser(s)

located and/or positioned within the cookbox 3202 below the cooking grate(s), and above the burn pot 2102 of the engine assembly 2500.

The pellet grill 3200 of FIGS. 32 and 33 further includes an example frame 3204. In the illustrated example of FIGS. 32 and 33, the frame 3204 includes one or more example support member(s) 3206 (e.g., one or more vertically oriented leg(s)) that are configured to support the cookbox 3202 above an underlying ground surface. The support member(s) 3206 and/or, more generally, the frame 3204 can be configured from any number and any type of structural components arranged in any manner that facilitates supporting the cookbox 3202 above an underlying ground surface when the pellet grill 3200 is in use. For example, while each of the one or more support member(s) 3206 shown in FIGS. 32 and 33 is fixed relative to the cookbox 3202, in other examples the frame 3204 can include one or more foldable, slidable, and/or telescoping support member(s) 3206 that facilitate collapsing and/or otherwise modifying the frame 3204 of the pellet grill 3200 when the pellet grill 3200 is not in use. The pellet grill 3200 of FIGS. 32 and 33 can further include one or more side table(s) coupled to the frame 3204 and/or to the cookbox 3202 of the pellet grill 3200.

The pellet grill 3200 of FIGS. 32 and 33 further includes an example lid 3208 configured to cover and/or enclose the cookbox 3202 of the pellet grill 3200 when the lid 3208 is in a closed position. The lid 3208 is movable relative to the cookbox 3202 between a closed position and an open position in which a cooking surface (e.g., a cooking grate) located on or within the cookbox 3202 is exposed. In the illustrated example of FIGS. 32 and 33, the lid 3208 is pivotally coupled to the cookbox 3202 via one or more hinge(s) and/or pivot(s) that mechanically couple the lid 3208 to the cookbox 3202. Movement of the lid 3208 of the pellet grill 3200 between the closed position and the open position can be facilitated via user interaction with an example handle 3210 that is coupled to the lid 3208.

The pellet grill 3200 of FIGS. 32 and 33 further includes an example hopper 3212 coupled to the cookbox 3202 and/or to the frame 3204, with the hopper 3212 being configured to hold and/or contain a supply of combustible wood pellets (e.g., pellet fuel). During operation of the pellet grill 3200, the combustible wood pellets pass from the hopper 3212 into the auger tube 1702 of the auger assembly 1700 via the opening 1710 formed in the sidewall 1708 of the auger tube 1702. Combustible wood pellets received in the auger tube 1702 from the hopper 3212 are thereafter transported through the auger tube 1702 toward and/or into the burn pot 2102 via rotation of the auger 1712 of the auger assembly 1700 (e.g., as driven by the auger motor 1722). Combustion of the wood pellets received in the burn pot 2102 can be initiated via activation of the ignitor 902 of the mounting bracket assembly 900. In this regard, the first end 904 of the ignitor 902 extends into the burn pot 2102 such that a heat-generating portion of the ignitor 902 contacts at least some of the wood pellets received in the burn pot 2102. Once combustion of the wood pellets received in the burn pot 2102 has commenced via the ignition process, the rate of such combustion can be managed via a controlled airflow generated by the fan 2504, with said airflow being delivered from the fan 2504 into the housing 2502, and through the housing 2502 to the burn pot 2102.

The following paragraphs provide various examples in relation to the disclosed ignitor mounting brackets for pellet grills.

Example 1 includes a mounting bracket. In Example 1, the mounting bracket includes a base and an ignitor tab. The base includes a first surface, a second surface, and a primary opening. The second surface is located opposite the first surface. The primary opening is formed in and extends through the base from the first surface to the second surface. The primary opening is configured to receive an auger tube of a pellet grill. The ignitor tab is coupled to the base. The ignitor tab includes an ignitor tab opening formed in and extending through the ignitor tab. The ignitor tab opening is configured to receive an ignitor of a pellet grill.

Example 2 includes the mounting bracket of Example 1. In Example 2, the base is configured to circumscribe the auger tube when the auger tube is received in the primary opening.

Example 3 includes the mounting bracket of Example 1. In Example 3, the base is planar.

Example 4 includes the mounting bracket of Example 1. In Example 4, the base has a hexagonal shape.

Example 5 includes the mounting bracket of Example 1. In Example 5, the primary opening has a hexagonal shape.

Example 6 includes the mounting bracket of Example 1. In Example 6, the ignitor tab extends from the base in a radially outward direction.

Example 7 includes the mounting bracket of Example 1. In Example 7, the base and the ignitor tab are collectively planar.

Example 8 includes the mounting bracket of Example 1. In Example 8, the mounting bracket further comprises a grounding tab coupled to the base. The grounding tab includes a grounding tab opening formed in and extending through the grounding tab. The grounding tab opening is configured to receive a grounding fastener.

Example 9 includes the mounting bracket of Example 8. In Example 9, the grounding tab extends from the base in a radially outward direction.

Example 10 includes the mounting bracket of Example 8. In Example 10, the base, the ignitor tab, and the grounding tab are collectively planar.

Example 11 includes the mounting bracket of Example 1. In Example 11, the mounting bracket further comprises a mounting tab coupled to the base. The mounting tab includes a mounting tab opening formed in and extending through the mounting tab. The mounting tab opening is configured to receive a mounting fastener.

Example 12 includes the mounting bracket of Example 11. In Example 12, the mounting tab is oriented perpendicularly relative to the base.

Example 13 includes the mounting bracket of Example 1. In Example 13, the mounting bracket further comprises a plurality of support tabs coupled to the base adjacent to the primary opening. Respective ones of the plurality of support tabs are oriented perpendicularly relative to the base.

Example 14 includes a pellet grill. In Example 14, the pellet grill includes a hopper, a burn pot, an auger assembly, and a mounting bracket assembly. The auger assembly extends between the hopper and the burn pot. The auger assembly includes an auger and an auger tube. The auger tube circumscribes the auger. The auger is configured to transport pellet fuel received from the hopper through the auger tube and into the burn pot. The mounting bracket assembly includes a mounting bracket and an ignitor removably coupled to the mounting bracket. The mounting bracket includes a base and an ignitor tab. The base includes a first surface, a second surface located opposite the first surface, and a primary opening formed in and extending through the base from the first surface to the second surface. The primary opening receives the auger tube. The ignitor tab is coupled to the base. The ignitor tab includes an ignitor tab opening formed in and extending through the ignitor tab. The ignitor tab opening receives the ignitor.

Example 15 includes the pellet grill of Example 14. In Example 15, the base circumscribes the auger tube.

Example 16 includes the pellet grill of Example 14. In Example 16, the ignitor tab extends from the base in a radially outward direction.

Example 17 includes the pellet grill of Example 14. In Example 17, the mounting bracket further includes a grounding tab coupled to the base. The grounding tab includes a grounding tab opening formed in and extending through the grounding tab. The grounding tab opening receives a grounding fastener.

Example 18 includes the pellet grill of Example 17. In Example 18, the grounding tab extends from the base in a radially outward direction.

Example 19 includes the pellet grill of Example 14. In Example 19, the mounting bracket further includes a mounting tab coupled to the base. The mounting tab includes a mounting tab opening formed in and extending through the mounting tab. The mounting tab opening receives a mounting fastener.

Example 20 includes the pellet grill of Example 19. In Example 20, the pellet grill further includes a housing configured to contain at least a portion of the burn pot, at least a portion of the auger assembly, and at least a portion of the mounting bracket assembly. The mounting tab of the mounting bracket is removably coupled to the housing via the mounting fastener.

Although certain example apparatus, systems, methods, and articles of manufacture have been disclosed herein, the scope of coverage of this patent is not limited thereto. On the contrary, this patent covers all apparatus, systems, methods, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A mounting bracket, comprising:
a flat, ring-shaped base including:
   a first planar surface;
   a second planar surface located opposite the first planar surface; and
   a primary opening formed in and extending through the base from the first planar surface to the second planar surface, the primary opening configured to receive an auger tube of a pellet grill; and
an ignitor tab integrally formed with and extending radially outward from the base, the ignitor tab including an ignitor tab opening formed in and extending through the ignitor tab, the ignitor tab opening configured to receive an ignitor of a pellet grill.

2. The mounting bracket of claim 1, wherein the base is configured to circumscribe the auger tube when the auger tube is received in the primary opening.

3. The mounting bracket of claim 1, wherein the base has a hexagonal shape.

4. The mounting bracket of claim 1, wherein the primary opening has a hexagonal shape.

5. The mounting bracket of claim 1, wherein the base and the ignitor tab collectively define a planar surface of the mounting bracket.

6. The mounting bracket of claim 1, further comprising a grounding tab integrally formed with the base, the grounding tab including a grounding tab opening formed in and extending through the grounding tab, the grounding tab opening configured to receive a grounding fastener.

7. The mounting bracket of claim 6, wherein the grounding tab extends radially outward from the base.

8. The mounting bracket of claim 6, wherein the base, the ignitor tab, and the grounding tab collectively define a planar surface of the mounting bracket.

9. The mounting bracket of claim 1, further comprising a mounting tab integrally formed with the base, the mounting tab including a mounting tab opening formed in and extending through the mounting tab, the mounting tab opening configured to receive a mounting fastener.

10. The mounting bracket of claim 9, wherein the mounting tab is oriented perpendicular relative to the base.

11. The mounting bracket of claim 1, further comprising a plurality of support tabs integrally formed with and oriented perpendicular relative to the base, wherein respective ones of the plurality of support tabs are located adjacent to the primary opening of the base.

12. A pellet grill, comprising:
   a hopper;
   a burn pot;
   an auger assembly extending between the hopper and the burn pot, the auger assembly including an auger and an auger tube, the auger tube circumscribing the auger, the auger configured to transport pellet fuel received from the hopper through the auger tube and into the burn pot; and
   a mounting bracket assembly including a mounting bracket and an ignitor removably coupled to the mounting bracket, the mounting bracket including:
      a flat, ring-shaped base having a first planar surface, a second planar surface located opposite the first planar surface, and a primary opening formed in and extending through the base from the first planar surface to the second planar surface, the primary opening receiving the auger tube; and an ignitor tab integrally formed with and extending radially outward from the base, the ignitor tab including an ignitor tab opening formed in and extending through the ignitor tab, the ignitor tab opening receiving the ignitor.

13. The pellet grill of claim 12, wherein the base circumscribes the auger tube.

14. The pellet grill of claim 12, wherein the mounting bracket further includes a grounding tab integrally formed with the base, the grounding tab including a grounding tab opening formed in and extending through the grounding tab, the grounding tab opening receiving a grounding fastener.

15. The pellet grill of claim 14, wherein the grounding tab extends radially outward from the base.

16. The pellet grill of claim 14, wherein the grounding fastener is oriented parallel to the ignitor.

17. The pellet grill of claim 12, wherein the mounting bracket further includes a mounting tab integrally formed with and oriented perpendicular relative to the base, the mounting tab including a mounting tab opening formed in and extending through the mounting tab, the mounting tab opening receiving a mounting fastener.

18. The pellet grill of claim 17, further including a housing configured to contain at least a portion of the burn pot, at least a portion of the auger assembly, and at least a portion of the mounting bracket assembly, wherein the mounting tab of the mounting bracket is removably coupled to the housing via the mounting fastener.

19. The pellet grill of claim 17, wherein the mounting fastener is oriented perpendicular to the ignitor.

20. The pellet grill of claim 12, wherein the mounting bracket further includes a plurality of support tabs integrally formed with and oriented perpendicular relative to the base, wherein respective ones of the plurality of support tabs are located adjacent to the primary opening of the base.

* * * * *